United States Patent [19]

Walker et al.

[11] Patent Number: 5,012,420

[45] Date of Patent: Apr. 30, 1991

[54] ACTIVE CLEARANCE CONTROL FOR GAS TURBINE ENGINE

[75] Inventors: Roger C. Walker, Fairfield; Scott P. Reese, West Chester; David L. Joyce, Middletown; David A. Kastrup, Cincinnati, all of Ohio

[73] Assignee: General Electric Company, Cincinnati, Ohio

[21] Appl. No.: 175,894

[22] Filed: Mar. 31, 1988

[51] Int. Cl.[5] .............................. F02C 7/12; F02C 7/18; F01D 25/08
[52] U.S. Cl. ............................... 364/431.02; 60/39.75; 415/1; 415/118; 415/175
[58] Field of Search ............................ 364/431.02, 550; 60/39.29, 39.75; 415/1, 115, 116, 118, 134, 138, 175, 178

[56] References Cited

U.S. PATENT DOCUMENTS

| | | | |
|---|---|---|---|
| 4,023,919 | 5/1977 | Patterson | 415/178 |
| 4,332,133 | 6/1982 | Schwarz et al. | 415/115 |
| 4,338,061 | 7/1982 | Beitler et al. | 415/178 |
| 4,621,335 | 11/1986 | Bluish et al. | 364/550 |
| 4,709,546 | 12/1987 | Weiler | 60/39.29 |
| 4,804,310 | 2/1989 | Fuller et al. | 415/115 |
| 4,805,398 | 2/1989 | Jourdain et al. | 60/39.75 |
| 4,815,928 | 3/1989 | Pineo et al. | 415/115 |
| 4,849,895 | 7/1989 | Kervistin | 364/164 |

FOREIGN PATENT DOCUMENTS 2104966 3/1983 United Kingdom .

Primary Examiner—Felix D. Gruber
Attorney, Agent, or Firm—Jerome C. Squillaro

[57] ABSTRACT

The invention concerns an active clearance control for controlling clearance between a turbine and a casing in a gas turbine aircraft engine.

The invention calculates the instantaneous clearance between a turbine casing and a turbine rotor, based on temperature. Two temperatures are involved. First, a steady state temperature (SSTemp) is computed for the rotor and the casing. SSTemp is a predicted, future temperature, which will be attained when the engine reaches steady state operation. Each SSTemp is computed based on presently occurring engine operating conditions, such as selected temperatures, pressures, and rotational speeds.

Changes which occur in the SSTemp's indicate the second temperatures, which are the instantaneous temperatures of the casing and rotor. These changes in SSTemp are caused by changes in the present operating conditions, which occur during engine acceleration and deceleration. The instantaneous temperatures indicate the diameters of the casing and the rotor, and thus the instantaneous clearance between them.

In another form of the invention, the computed instantaneous clearance is used to control air which is bled from the fan and ducted onto the casing, in order to attain a desired clearance.

38 Claims, 30 Drawing Sheets

| Engine Designation | Hub & Web Computed Temperature |
|---|---|
| T | KHPTC19 |
| F | (Told − Tref) * [EXP(−Engofftime/Time Const)] + Tref |

| | 700 | 701 | 702 | 703 | 704 |
|---|---|---|---|---|---|
| | L.P. Turbine Inlet T. Status = 4 or 7 | Comp. Disch. T. Status = 4 or 7 | Ambient P. Status > 13 | Total Air Temp. Status > 13 | Set Override |
| 705 → | T | X | X | X | T |
| 706 → | F | T | X | X | T |
| 707 → | F | F | (T) 710 | X | T |
| 708 → | F | F | F | T | T |
| 709 → | F | F | F | F | F |

| Constant | Value | Units |
| --- | --- | --- |
| KHPTC1 | .071 | Inches |
| KHPTC2 | .306898 | (-) |
| KHPTC3 | .693102 | (-) |
| KHPTC5 | 21.0 | Deg. C |
| KHPTC6 | 4.1914E-9 | 1/Deg C$^2$ |
| KHPTC7 | 1.2681E-5 | 1/Deg C |
| KHPTC8 | -0.801512 | Inches |
| KHPTC9 | 13.062087 | Inches |
| KHPTC10 | .196974 | (-) |
| KHPTC11 | .803026 | (-) |
| KHPTC12 | 1.177 | Inches |
| KHPTC13 | 8.4E-6 | In/PSIA |
| KHPTC14 | 3.5981E-5 | 1/Deg C$^2$ |
| KHPTC15 | 1.2704E-5 | 1/Deg C |
| KHPTC18 | 17.286943 | Inches |
| KHPTC19 | 150.0 | Deg C |
| KHPTC20 | 15.0 | Deg C |
| KHPTC21 | 0.0004 | In/Iteration |
| KHPTDBORETP | 5.616 | Sec |
| KHPTDBORETCP | 111.24 | Sec |
| KHPTDBORETSD | 438 | Min |
| KHPTDBOREK1 | .999 | (-) |
| KHPTDWEBTP | 5.874 | Sec |
| KHPTDWEBTCP | 68.118 | Sec |
| KHPTDWEBTSD | 375 | Min |
| KHPTDWEBK1 | 1.0265 | (-) |
| KHPTCTP | 10.08 | Sec |
| KHPTCTCP | 55.476 | Sec |
| KHPTCK1 | .9394 | (-) |
| KHPTMAX | 1.00 | (-) |
| KHPTKP | -6.71111E+04 | %/In |
| KHPTTC | 6.48E-3 | 1/Sample |
| KHPTCMAX | 77.8 | % |
| KHPTCMIN | 0.0 | % |
| KMAXRTE | 22.2222 | %/Sample |
| KMINRTE | -22.2222 | %/Sample |

FIG. 19.

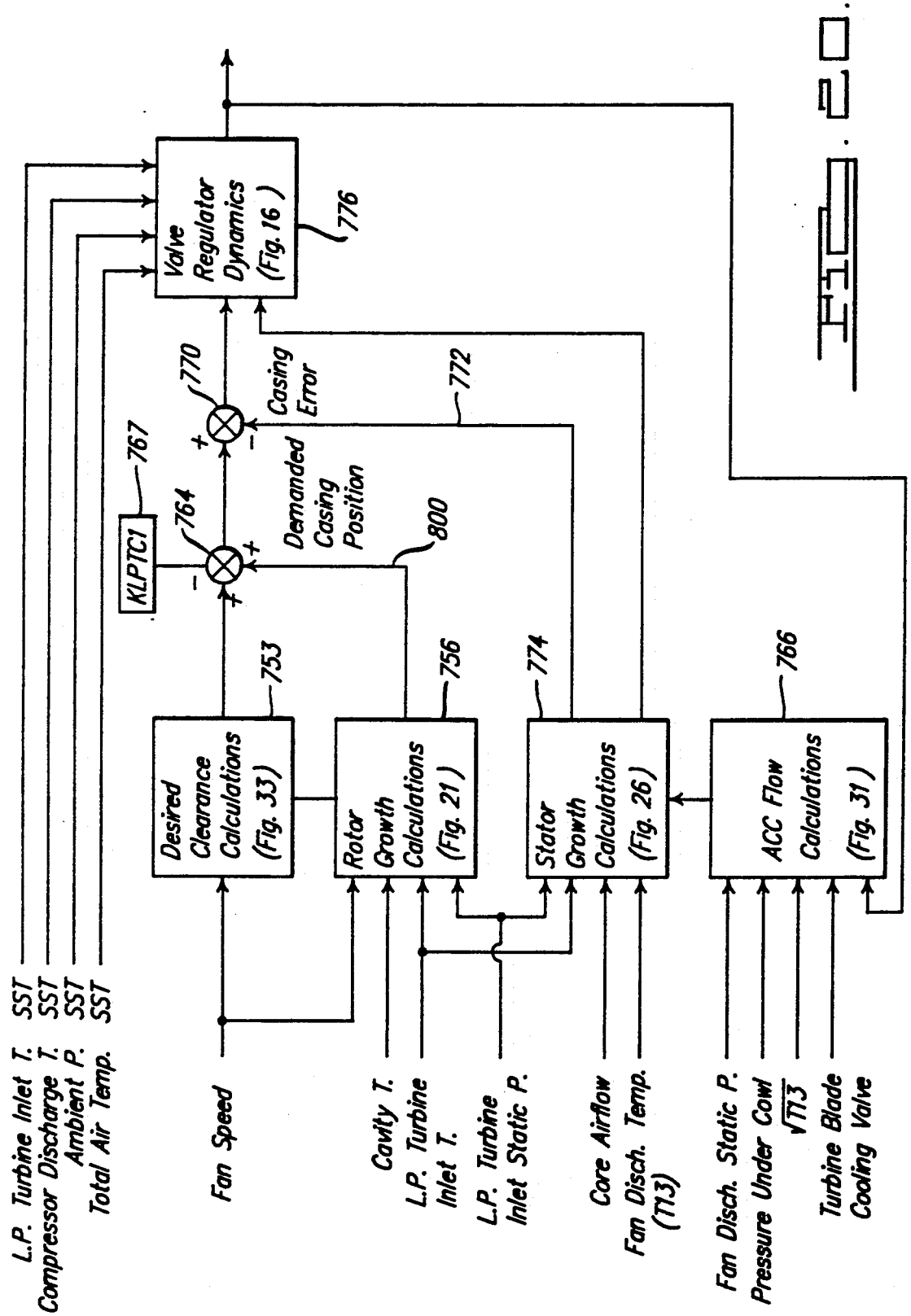

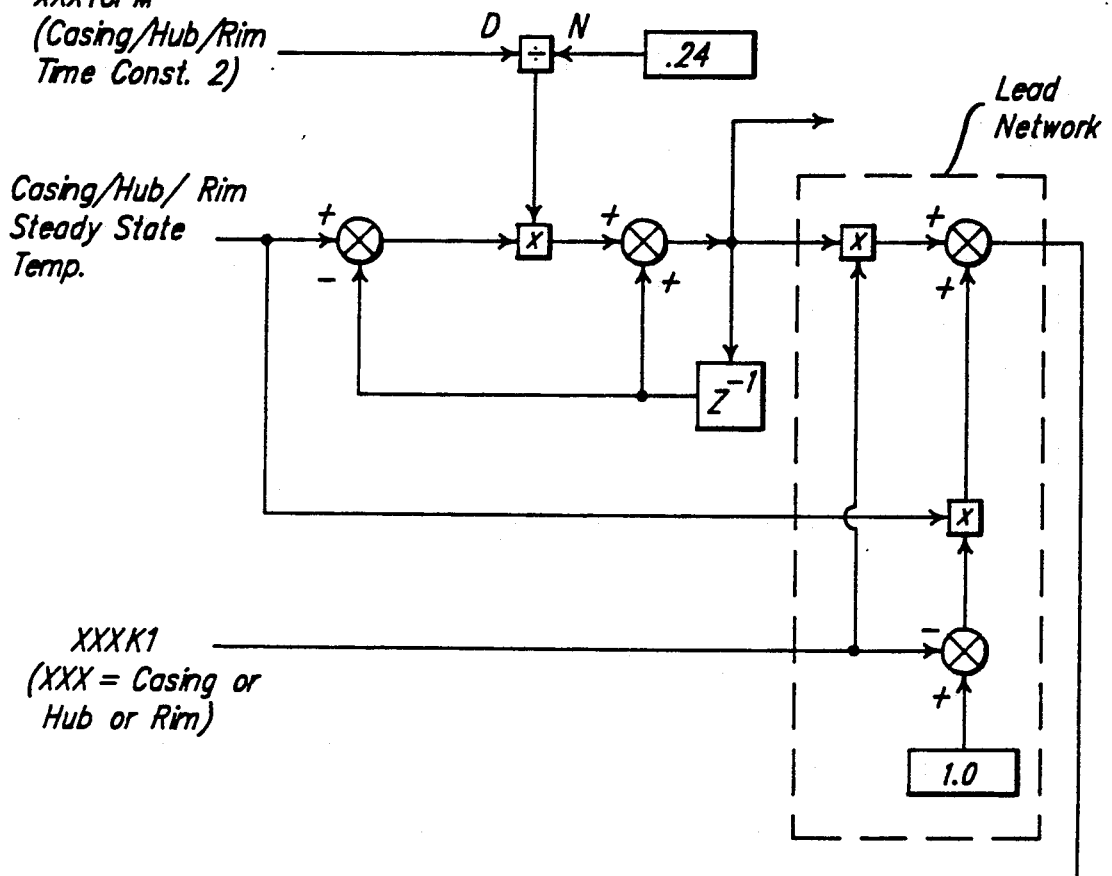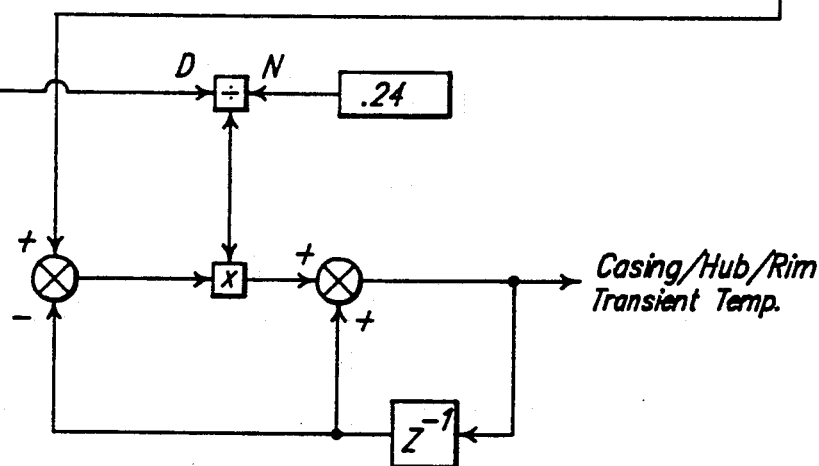
FIG. 32.

| Constant | Value | Units |
| --- | --- | --- |
| KLPTC1 | .0647 | Inches |
| KLPTC2 | 21.0 | Deg C |
| KLPTC3 | 4.1914E-9 | 1/Deg C**2 |
| KLPTC4 | 1.2681E-5 | 1/Deg C |
| KLPTC5 | 4.4069095 | Inches |
| KLPTC6 | 8.9583326 | Inches |
| KLPTC7 | 0 | Seconds |
| KLPTC8 | 0 | Seconds |
| KLPTC9 | 22.88228 | Inches |
| KLPTC12 | 15.0 | Deg C |
| KLPTC14 | 150.0 | Deg C |
| KLPTC15 | -2.787E-5 | In/PSIA |
| KLPTC16 | .9634 | (-) |
| KLPTC17 | .0001 | In./Iteration |
| KLPTCK1 | .8319 | (-) |
| KLPTCTCP | 65.631 | Sec |
| KLPTCTP | 29.014 | Sec |
| KLPTDHUBK1 | 1.0342 | (-) |
| KLPTDHUBTCP | 71.034 | Sec |
| KLPTDHUBTP | 8.502 | Sec |
| KLPTDHUBTSD | 480 | Minutes |
| KLPTDRIMK1 | 1.066 | (-) |
| KLPTDRIMTCP | 56.16 | Sec |
| KLPTDRIMTP | 9.426 | Sec |
| KLPTDRIMTSD | 480 | Minutes |
| KLPTKP | -2.5E4 | %/In |
| KLPTTC | .0057 | 1/Sample |
| KLPTMAX | 1.0 | - |
| KLPTCMAX | 77.8 | Percent |
| KLPTCMIN | 0.0 | Percent |
| KMAXRTE | 22.2222 | %/Sample |
| KMINRTE | -22.2222 | %/Sample |

FIG. 34.

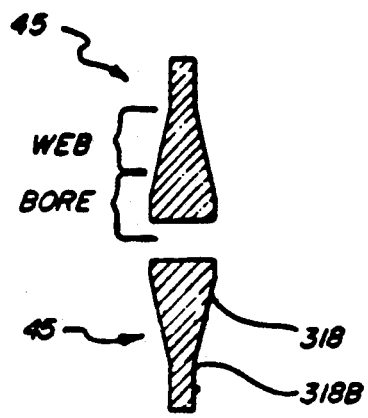
FIG. 35.
FIG. 36.
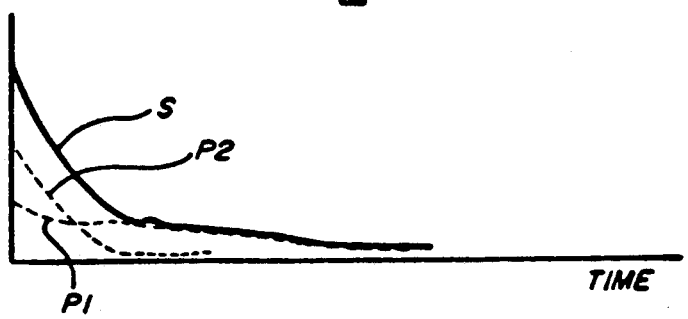
FIG. 37.
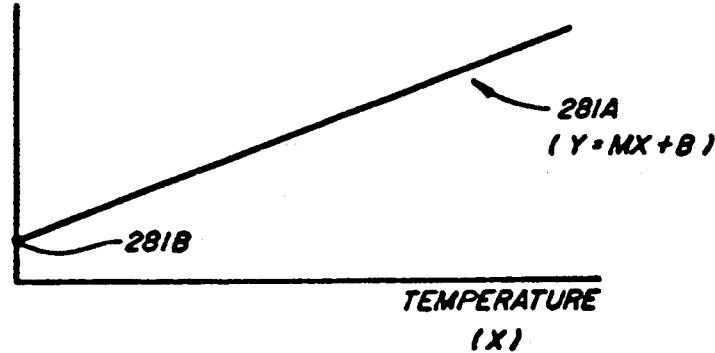
FIG. 38

ACTIVE CLEARANCE CONTROL FOR GAS TURBINE ENGINE

This application contains subject matter related to that in U.S. patent application entitled "Active Clearance Control" filed on Feb. 24, 1988, Ser. No. 160,052, by Davison, Kast, and Clark and now U.S. Pat. No. 4,928,240, and to that in U.S. patent application entitled "Gas Turbine Clearance Control" filed on Mar. 31, 1988, Ser. No. 176,004, by Shotts and Shetty and now abandoned. Both applications are assigned to the Assignee of the present application.

The invention relates to apparatus which control the clearance between turbine blades and a turbine shroud in a gas turbine aircraft engine.

BACKGROUND OF THE INVENTION

FIG. 1 illustrates a twin spool turbofan aircraft engine. An incoming airstream 3 is initially compressed by a booster compressor 6 and is then ducted to a high pressure compressor 9 in which the air is further compressed and from which the compressed air is delivered to a combustor 12. In the combustor, fuel (not shown) is injected into the compressed air, ignition occurs, and the hot, high-energy gas stream 14 which is produced is ducted to a high-pressure turbine 15.

The impact of the high-energy gas stream 14 causes rotation of the high-pressure turbine (HPT) 15, which, in turn, rotates the high-pressure compressor 9 connected to it. The high energy gas stream 14 then impinges upon a low pressure turbine 18, causing it to also rotate, thereby rotating the booster compressor 6 and a ducted fan 21. The fan 21 produces a propulsive airstream 24 which provides most of the thrust produced by the engine, while the residual gas stream 27 exhausting from the low pressure turbine 18 provides supplementary thrust.

The high pressure compressor 9, together with the high pressure turbine 15, comprise one spool, which is commonly called the "core." The other spool includes the fan 21, the booster 6, and the low pressure turbine 18.

Region 30 of high-pressure turbine 15 is shown in more detail in FIGS. 2 and 3A. In those figures, a clearance 33 is shown between blades 36 of the high pressure turbine 15 in FIG. 1 and a casing (or "shroud" or "stator"), 39 which surrounds the turbine blades. It is desired to maintain this clearance 33 as small as possible, in order to minimize the leakage of gasses indicated by arrow 42. Such leaking gasses impart virtually no momentum to the turbine blades 36, and represent a loss in energy.

It may be thought that the leakage problem may be eliminated by the expedient of manufacturing the engine with a sufficiently small clearance 33 which limits leakage to an acceptable value. However, such is not the case, because several factors cause the clearance 33 to change during engine operation. Five of these factors will now be explained.

First, during acceleration of the high-pressure turbine 15 in FIG. 1 from a ground idle speed of approximately 6,200 rpm to a take-off speed of approximately 11,000 rpm, the turbine disc 45A and blades 36 in FIGS. 1 and 2 expand in diameter (dimension 48 in FIG. 1) because of centrifugal force. This expansion is commonly termed "elastic growth" and is illustrated by the drop in clearance in region 61 in FIG. 3. The centrifugal force is quite large, as an example will show.

Centrifugal acceleration equals $w^2 r$, wherein $w$ is angular velocity, in radians per second, and $r$ is radius, in feet. 11,000 revolutions per minute correspond to about 175 revolutions per second. If the diameter 48 is two feet, then the radius, $r$, is one foot, and thus the centrifugal acceleration equals $(175 \times 2 \times pi)^2$, or $1.21 \times 10^6$ feet/second$^2$. Dividing this value by the acceleration due to gravity, namely, 32.2 feet/second$^2$, yields a centrifugal force of approximately 37,600 G's.

This large G field occurs immediately upon acceleration and causes the diameter of the turbine rotor to increase. The actual increase in diameter from ground idle speed to take-off speed can be 0.028 inches. Therefore, if the diameter of the shroud 39 in FIG. 2 stays constant, the rotor elastic growth tends to diminish the clearance 33, and there exists a risk that the blades 36 may contact the shroud 39.

The second factor is the increased diameter of the shroud 39 which occurs because of the increased pressure of the gas stream 14. The pressure increase occurs at about the same time as the acceleration of the rotor 45 occurs. A typical pressure increase is from 41 psia at point 40 in FIG. 1 during ground idle to 380 psia at take-off speed. This increase in pressure can cause an increase in shroud diameter (which is twice the length of radius 41A in FIG. 2) of 0.004 inches. The increase in shroud diameter is represented approximately by region 43 in FIG. 3.

The third factor is the thermal expansion of the turbine blades 36 in FIG. 2: the temperature increase of the gas stream 14 causes the blades 36 in FIG. 2 to increase in length 51. A typical temperature increase of the gas stream 14 from ground idle to take-off speeds can be from 1300 degrees F. to 2500 degrees F. This increase in temperature causes the length 51 in FIG. 2 of the turbine blades 36 to increase, and by as much as 0.025 inches. This thermal blade growth is represented approximately by the reduction in clearance in region 38 in FIG. 3. This increase in length further tends to reduce the clearance 33 in FIG. 2.

The fourth factor is thermal growth of the shroud, caused by the increased temperature of the gas stream 14, and which increases shroud diameter. However, the increase in shroud diameter is much slower than the three changes in dimension which result from the three factors discussed above, and is represented by the gradual increase in shroud diameter indicated in region 44 in FIG. 3.

The fifth factor involves thermal growth of the turbine disc 45A of the turbine rotor 45, shown in FIGS. 1 and 35. While the disc 45A is not subject to the hot combustor exhaust 14 in FIG. 1, it is however in the presence of hot air which has been bled from the compressor 9 of the engine.

Compressor bleeds are used in order to accomplish such tasks as purging the internal region 54 of the engine of lubricant vapors and other gasses. The compressor bleeds are at higher-than-ambient temperature, causing the turbine rotor 45 in FIG. 2 to gradually assume a higher-than-ambient temperature, and thus to expand. The expansion is gradual because the compressor bleeds are not so hot as the airstream 14 (the hottest compressor bleed available is approximately 1100° F.) and because the thermal mass of the rotor delays rotor heating. The rotor thermal growth is represented by region 55 in FIG. 3.

Therefore, to repeat: the clearance 33 in FIG. 2 is affected by the following factors in the following approximate order. Initially, (1) rotor elastic growth occurs, followed by (2) casing pressure growth. Then, (3) blade thermal growth occurs, followed by (4) casing thermal growth occur. Subsequently, (5) rotor thermal growth occurs.

A specific example of these changes in dimension will now be explained with reference to FIG. 3. Engine acceleration begins at a time of zero seconds, as indicated. The clearance at start up is indicated by point 66, and is approximately 0.048 inches. After the elapse of about 10 seconds, a take-off speed of 11,000 rpm has been attained, as shown in box 68, and centrifugal growth of the rotor causes a growth to approximately point 71, thereby shrinking the clearance.

Within circle 90 a minimum clearance occurs which then increases as time progresses. Such a minimum is termed a "pinch point" and places a limit upon the minimum clearance 33 in FIG. 2 which can be manufactured into the engine. For example, if the rotor were designed so that its initial clearance were clearance 93 in FIG. 3, the rotor would follow dashed line 94 upon acceleration, and the rotor would strike the casing at point 96, which cannot be allowed. Clearances at conditions other than the pinch point are more open than required. Therefore, to reduce this needlessly large clearance, active clearance control is used to control the diameter of the casing 39 by blowing cold air onto the casing. As shown in FIG. 1A, fan discharge air 97A is ducted to the turbine casing, as indicated by arrows 97, and a valve 134 controls the amount of air blown onto the casing.

Several forms of the invention provide improvements to the types of active clearance control just described, as well as to other types.

OBJECTS OF THE INVENTION

It is an object of the invention to provide an improved clearance control for a gas turbine engine.

SUMMARY OF THE INVENTION

The invention calculates the instantaneous clearance between a turbine casing and a turbine rotor, based on temperature. Two temperatures are involved. First, a steady state temperature (SSTemp) is computed for the rotor and the casing. SSTemp is a predicted, future temperature, which will be attained when the engine reaches steady state operation. Each SSTemp is computed based on presently occurring engine operating conditions, such as selected temperatures, pressures, and rotational speeds.

Changes which occur in the SSTemp's indicate the second temperatures, which are the instantaneous temperatures of the casing and rotor. These changes in SSTemp are caused by changes in the present operating conditions, which occur during engine acceleration and deceleration. The instantaneous temperatures indicate the diameters of the casing and the rotor, and thus the instantaneous clearance between them.

In another form of the invention, the computed instantaneous clearance is used to control air which is bled from the fan and ducted onto the casing, in order to attain a desired clearance.

BRIEF DESCRIPTION OF THE DRAWING

(FIGS. 5-19 explain details of FIG. 4.)

FIG. 5 illustrates details of block 107 in FIG. 4, concerning computation of HPT rotor displacement.

FIG. 6 illustrates details of block 209 in FIG. 5, concerning the computation of the thermal component of HPT rotor displacement.

FIG. 7 illustrates details of block 218 in FIG. 6, concerning computation of HPT rotor temperatures while the engine is running.

FIG. 8 illustrates details of block 211 in FIG. 6, concerning computation of the thermal component of HPT rotor deflection.

FIG. 9 illustrates details of block 222 in FIG. 8, concerning computation of HPT rotor temperature when the engine is not running.

FIG. 10 illustrates details of block 126 in FIG. 4, concerning computation of HPT casing displacement.

FIG. 11 illustrates an overview of HPT casing displacement computations.

FIG. 12 illustrates details of block 362A in FIG. 11, concerning computation of HPT casing temperature.

FIG. 13 illustrates details of block 362 in FIG. 11, concerning computation of HPT casing displacement.

FIG. 14 illustrates details of block 138 in FIG. 4, concerning computation of the amount of cooling airflow delivered to the HPT casing 39 in FIG. 1.

FIG. 15 illustrates details of the temperature lag network 266 in FIGS. 7 and 12.

FIG. 16 illustrates details of block 129 in FIG. 4, concerning control system dynamics for valve 134 in FIG. 1A.

FIG. 17 illustrates details of block 630 of FIG. 16.

FIG. 18 illustrates details of block 101 in FIG. 4, concerning computation of demanded HPT turbine clearance.

FIG. 19 lists constants used by the computations of FIGS. 4-18.

FIG. 20 illustrates an overview of part of the invention which is used to control clearance of the low pressure turbine (LPT) 18 in FIG. 1. (FIGS. 21-34 explain details of FIG. 20.)

FIG. 21 illustrates details of block 756 in FIG. 20, concerning computation of LPT rotor displacement.

FIG. 22 illustrates details of block 775 in FIG. 21, concerning the computation of the thermal component of LPT rotor displacement.

FIG. 23 illustrates details of block 819 in FIG. 22, concerning adjustment of time constants for the LPT rotor, based on engine operating conditions.

FIG. 24 illustrates details of block 820 in FIG. 22, concerning computation of LPT rotor temperatures while the engine is running.

FIG. 25 illustrates details of block 830 in FIG. 22, concerning computation of the thermal component of LPT rotor deflection.

FIG. 26 illustrates an overview of the computation of LPT casing displacement.

FIG. 27 illustrates details of block 939 in FIG. 26, concerning computation of LPT thermal casing displacement.

FIG. 28 illustrates details of block 970 in FIG. 27, concerning modification of LPT casing time constants based on engine operating point.

FIG. 29 illustrates details of block 973 in FIG. 27, concerning computation of LPT casing temperature.

FIG. 30 illustrates details of block 976 in FIG. 27, concerning computation of LPT casing displacement.

FIG. 31 illustrates details of block 766 in FIG. 20, concerning computation of the amount of cooling airflow delivered to the LPT casing 744 in FIG. 1A.

FIG. 32 illustrates details of the temperature lag network 825 in FIGS. 22 and 29.

FIG. 33 illustrates details of block 753 in FIG. 20, concerning computation of demanded LPT turbine clearance.

FIG. 34 lists constants used by the computations of FIGS. 20–33.

FIG. 35 illustrates a cross-sectional view of a turbine disc.

FIG. 36 illustrates a temperature-time plot S of a second order heat transfer model.

FIG. 37 illustrates a linear adjustment of a thermal expansion coefficient, based on temperature.

FIG. 38 illustrates the meaning of a cold clearance constant, such as KHPTC1 in FIG. 4.

DETAILED DESCRIPTION OF THE INVENTION

(A) System Overview

Figure 3A:
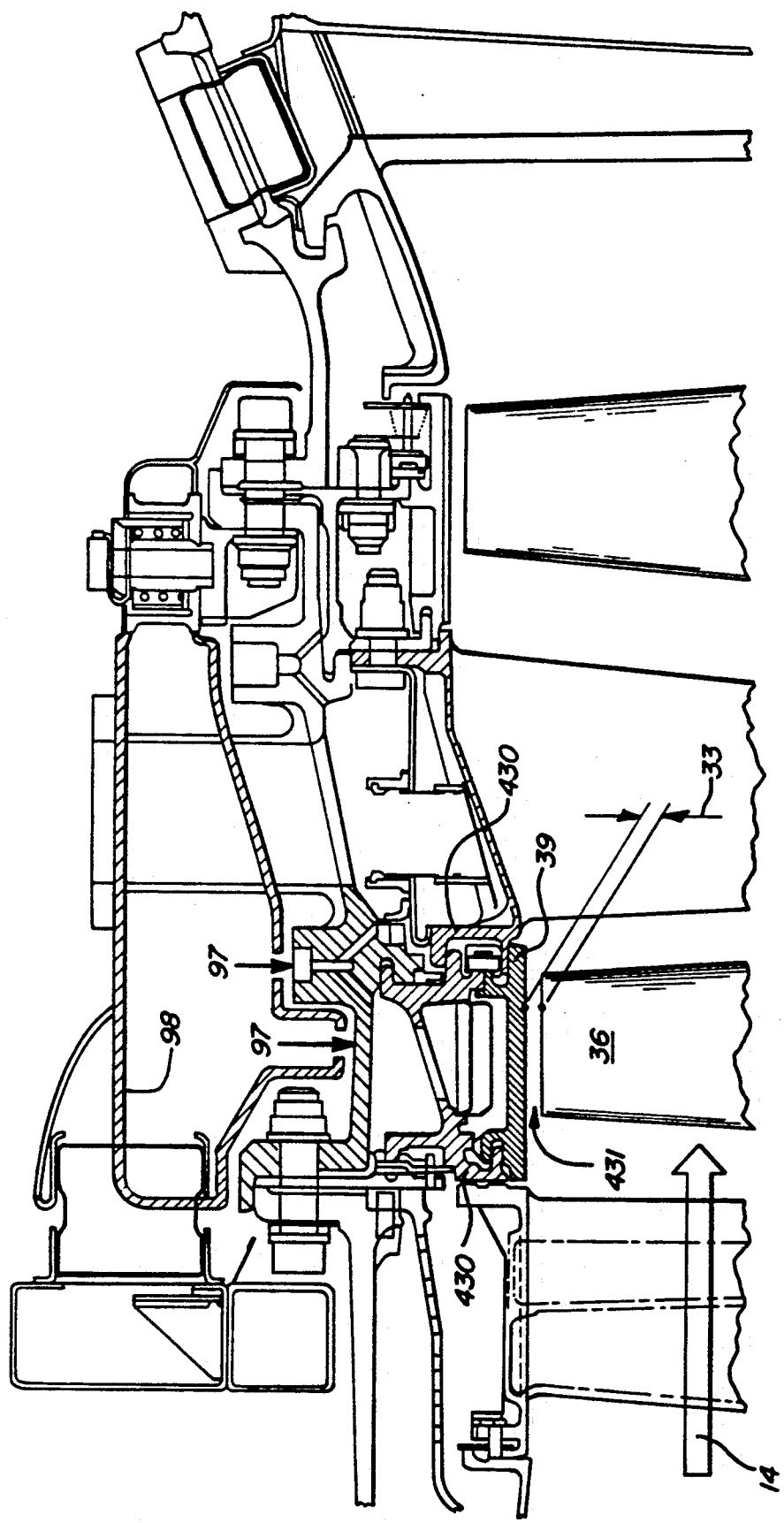
FIG. 3A illustrates a cross-sectional view which shows greater detail of region 30 in FIG. 1.
Figure 4:
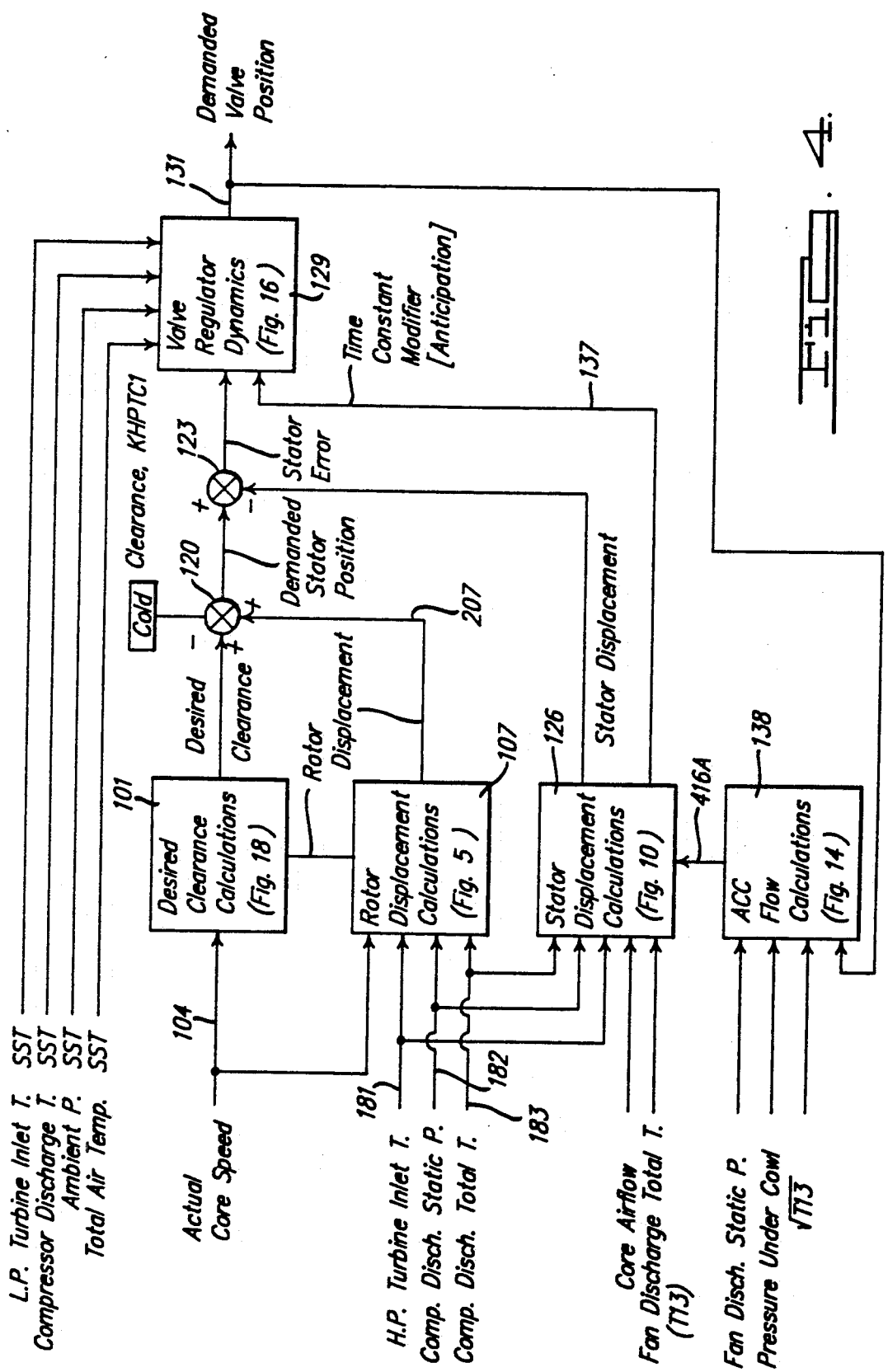
FIG. 4 illustrates an overview of part of the invention which is used to control clearance of the high pressure turbine (HPT) 15 in FIG. 1.

FIG. 4 illustrates an overview of one form of the invention. Block 101 computes a desired clearance 33, shown in FIGS. 2 and 3A, which is to be attained under (a) the present core speed, which is provided on line 104 in FIG. 4, and (b) the present rotor displacement, which is provided by block 107. (Displacement refers to deviation of rotor radius 48A in FIG. 2 from the radius existing when the rotor is cold. The term "rotor" refers to the component which includes both the rotor disc 45A in FIG. 1 and the turbine blades 36 in FIGS. 1 and 2: the disc and the rotor are treated as separate components, although the latter includes the former.)

The rotor displacement of block 107 is based on measurements of the following engine operating parameters: (a) actual (not corrected) core speed; (b) total temperature at the high pressure turbine inlet, which is calculated at point 109 in FIG. 4, based on temperature measured at point 761 in FIG. 1A; (c) compressor discharge static pressure, measured at point 112; and (d) compressor discharge total temperature, measured also at point 112.

The displacement is treated as a superposition of three individual displacement components. The first component is centrifugal displacement, which is affected by rotor rotational speed and temperature, the latter of which affects the Young's Modulus of the rotor material, and thus the amount by which the rotor stretches because of centrifugal force.

Figure 2:
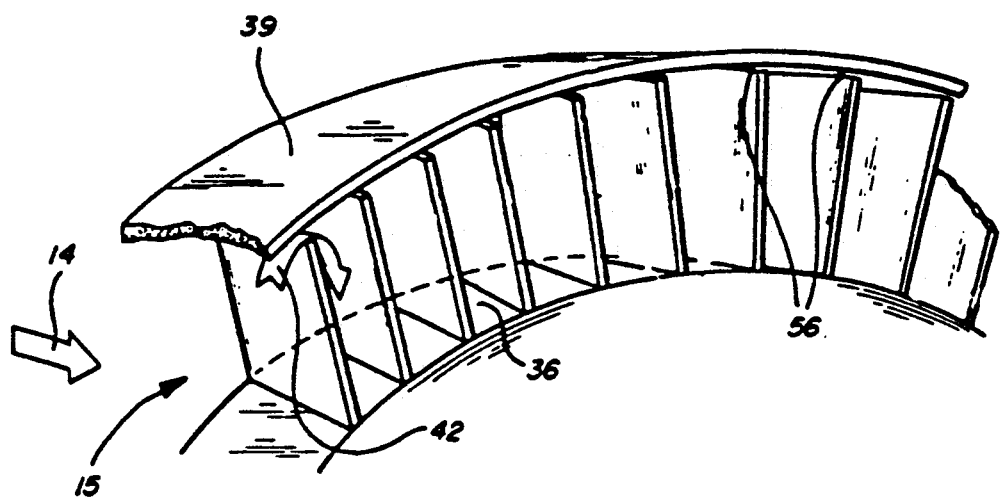
FIG. 2 illustrates in greater schematic detail the region 30 in FIG. 1.

The second component is thermal displacement of the turbine blades 36 in FIG. 2, which is caused by changes in blade temperature. Blade temperature is affected by the temperature of the air flowing around the blades (e.g., the airstream 14 in FIGS. 2 and 2A), and the temperature of the cooling airflow 185 in FIG. 2A passing through the interiors of the blades.

Figure 1:
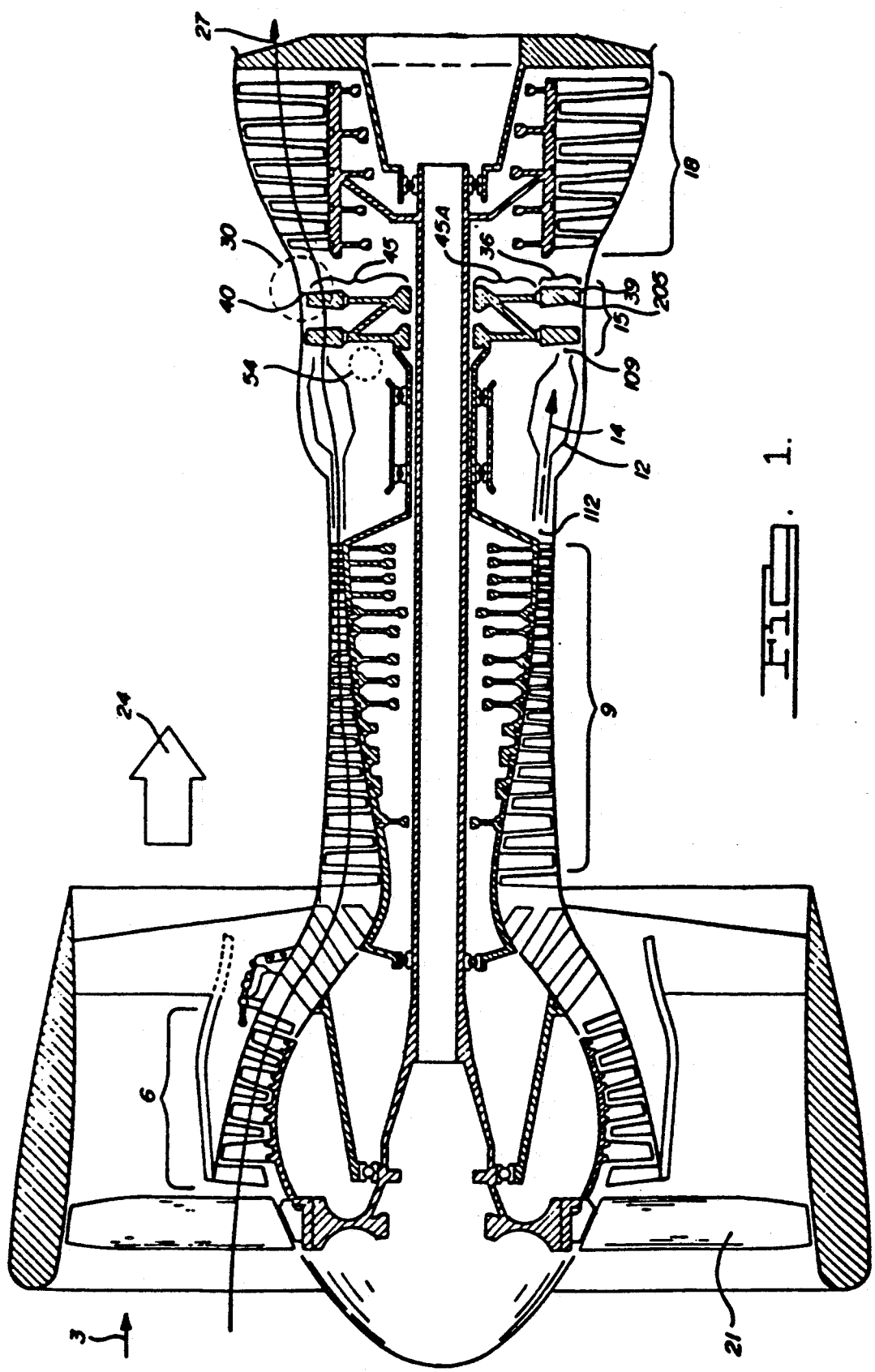
FIGS. 1 and 1A illustrate, in schematic cross-section, a gas turbine aircraft engine of the high bypass type.

The third component is thermal displacement of the rotor disk 45A in FIG. 1. The amount of this displacement is determined by the temperature of the disk 45A, which is affected by both the temperature and the heat flow conditions of the medium surrounding the disk.

This rotor displacement, provided by block 107, is added to the desired clearance in summer 120, in which is subtracted a constant, K1. (K1 is equal to constant KHPTC1 in FIG. 19.) K1 indicates the deviation of (a) actual clearance existing in the turbine when the turbine is at room temperature, that is, at a cold temperature, from (b) the desired clearance indicated by block 101 in FIG. 4 when the rotor is cold. That is, K1 is the pre-existing clearance in the turbine, and adjusts the demanded casing displacement, on line 121, because K1 affects the amount of additional displacement needed to make clearance proper.

Block 126 FIG. 4 computes actual casing displacement, which is the deviation of casing diameter 41 in FIG. 1 from the diameter when the casing is cold. As with rotor displacement, casing displacement is composed of more than one component, and these components include a thermal growth component and a pressure growth component. The thermal component is based on both (a) temperature of the casing and (b) the change in the thermal expansion coefficient of the casing which occurs as temperature changes. The pressure component is the growth resulting from pressure changes within the turbine casing.

The demanded casing displacement, produced by summer 120 on line 121, is reduced, in summer 123, by the actual casing displacement, computed in block 126, thereby providing a casing error signal on line 124. The error signal indicates the difference between actual casing displacement and demanded casing displacement. For example, if a rotor growth occurs, which increases the signal on line 207, then demanded casing displacement, on line 121, increases, and casing error, on lines 124, also increases.

Figure 1A:
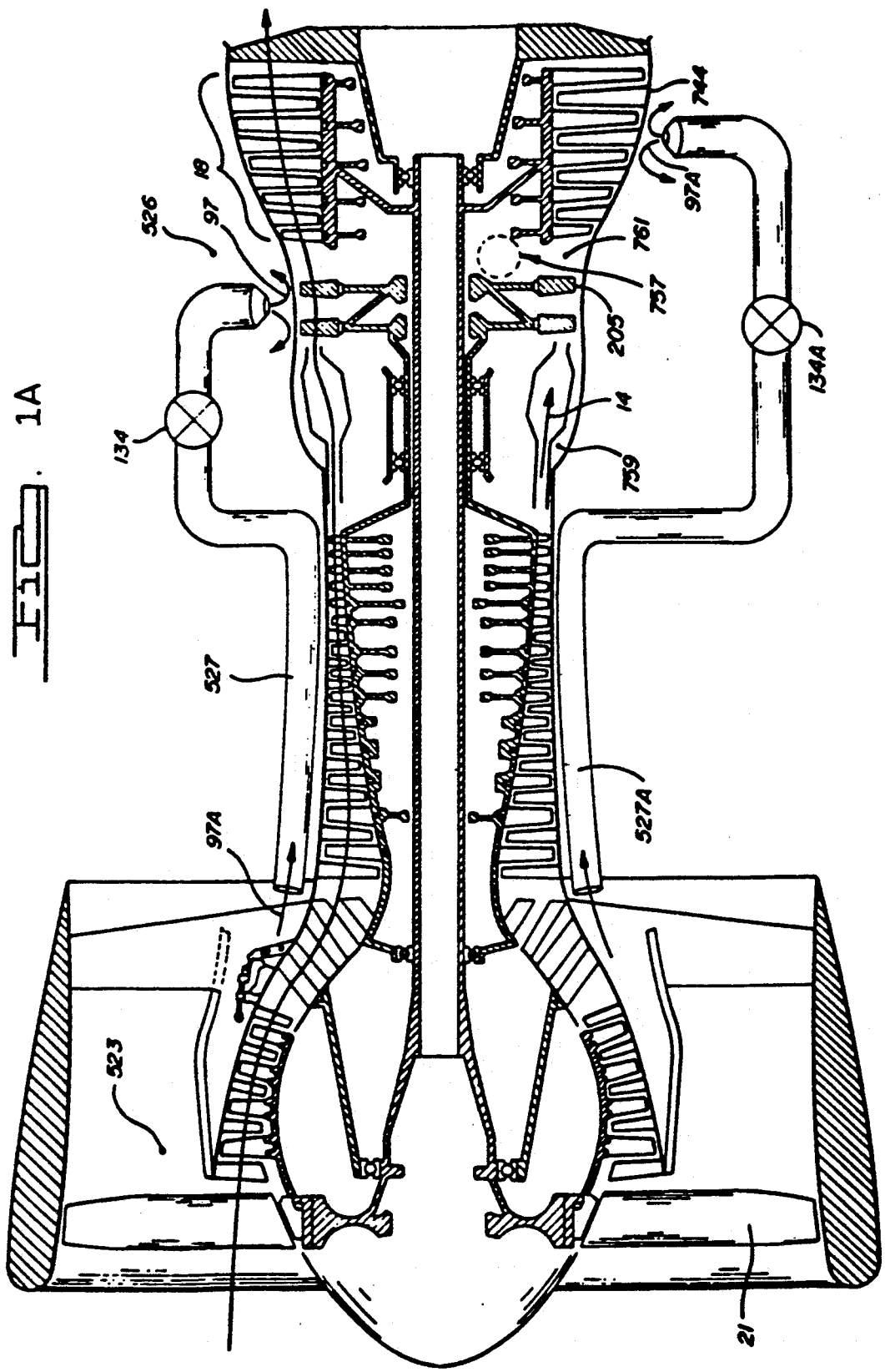

A valve regulator block 129 receives the casing error signal, and produces a signal on line 131, which drives the valve 134 in FIG. 1A to the proper position in order to provide the proper amount of fan bleed to the casing 39, in order to attain the displacement demanded by the signal provided by line 121 in FIG. 4.

Block 126 provides another signal, on line 137, which informs the valve regulator block 129 of the direction and speed with which the casing is growing or shrinking. In response, block 129 modulates the demanded valve position, on line 131, in order to avoid abrupt movements of the valve 134.

For example, when the casing is expanding rapidly toward the demanded diameter, it is preferable to gradually adjust the valve position in order to slow the growth of the casing as it approaches its intended diameter, rather than to allow the casing to approach the demanded diameter at a high rate of expansion, and then abruptly activate cooling air just before the casing reaches the demanded diameter. Such an abrupt activation requires slamming the valve open, which is not desirable. The signal on line 137 indicates the change in the rate of expansion of the casing, and block 129 causes gradual opening and closing of the valve 134. Block 129 performs other functions, which will be later described.

The preceding discussion has considered the operation of the invention during steady-state conditions of the engine. In addition, the invention computes rotor and casing displacements during non-steady state conditions, i.e., during transients, such as accelerations and decelerations. The invention does so by monitoring the behavior of the computed steady-state temperatures of the rotor and the casing. Based on both the direction and rate of change of these temperatures, the invention estimates the present respective temperatures. (In general, it is not feasible, during a transient, to compute these temperatures based directly on the operating parameters given at the left of FIG. 4, because a finite time is needed for the components to adjust their temperatures in response.)

This discussion will now consider in more detail the computations which have been outlined in the overview of FIG. 4. Details of the computation of rotor displacement, in block 107, will be considered first.

Figure 5:
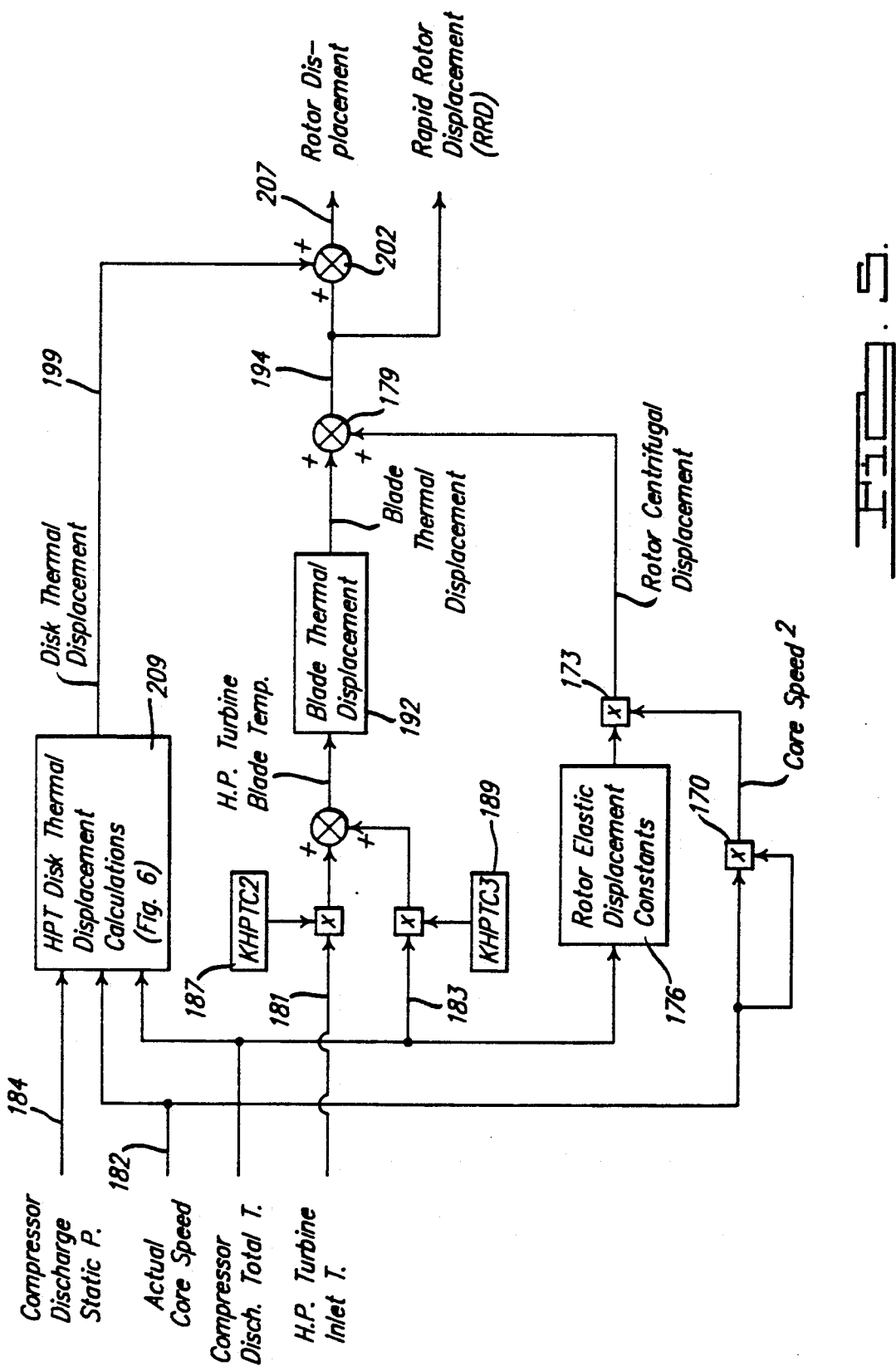

(B) HPT Rotor Displacement, Overview (FIG. 5)

FIG. 5 illustrates an overview of the computation of rotor displacement, the details of which are given in FIGS. 6–9. In general, as stated above, the computation is a superposition of three individual displacements, each caused by different factors. One factor is centrifugal force, which changes the diameter of the rotor itself. Another factor is temperature, which causes the rotor to increase in diameter as its temperature increases. A third factor is the change in turbine blade length 51 in FIG. 2 which occurs in response to temperature changes.

In particular, in FIG. 5, core speed feeds to multiplier 170, which multiplies core speed by itself, thus presenting the square of core speed to multiplier 173. One reason for this squaring is that centrifugal force is a function of core speed squared (specifically, centrifugal acceleration equals $w^2r$, wherein w is rotational speed, in radians per second, and r is radius in feet.) Therefore, the square of core speed allows one to compute, by use of block 176, the amount of rotor stretching which centrifugal force induces, and this stretching is termed elastic displacement.

However, mere knowledge of core speed alone does not allow one to accurately compute elastic displacement, because Young's modulus of the rotor changes as temperature changes. Therefore, block 176 receives compressor discharge temperature, from which the temperature of the rotor disc, and thus the actual Young's modulus, can be inferred. (As discussed in the Background of the Invention, compressor bleeds are used to purge the region containing the disc 45A, and so disc temperature can be inferred from bleed temperature.) As a result, the output of multiplier 173 is the elastic growth of the rotor, computed based on rotor temperature and centrifugal force, and is fed to summer 179. This elastic growth, or centrifugal displacement, is the first of the three superimposed growth components.

Figure 2A:
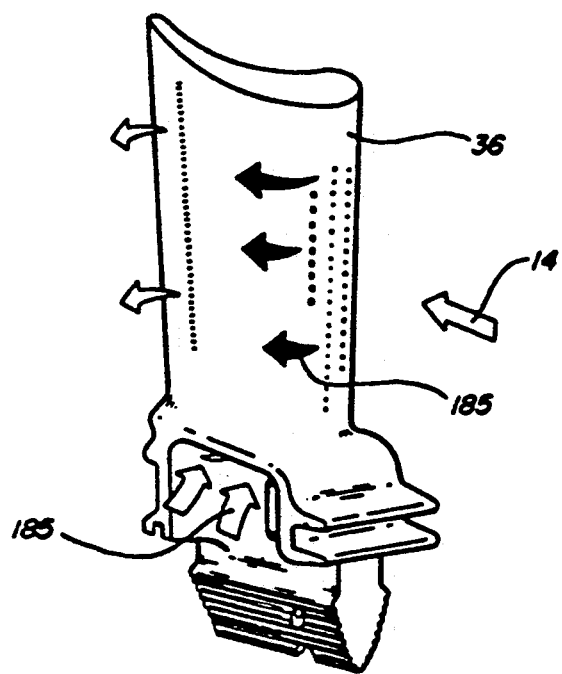
FIG. 2A illustrates a turbine blade 36 which is cooled by internal airstreams 185.

The second component of the rotor growth is the thermal growth of rotor blades, which occurs in response to changes in temperature of the blades. The temperature of the blades is influenced by the temperatures of two airflows, namely, compressor discharge temperature and turbine inlet temperature, which are indicated on lines 181 and 183. One reason for the dual dependence is that, as shown in FIG. 2A, the blades are surrounded by an airflow 14 which is at or near the turbine inlet temperature. Further, the blades are cooled by airstreams 185 which are supplied by a compressor discharge. In general, the resulting temperature of the blades will lie between the temperatures of these two airstreams. The constants in boxes 187 and 189 in FIG. 5, the values of which are given in FIG. 19, are weighting factors which provide an interpolation between these two temperatures. For example, using these two constants, a turbine inlet temperature of 2400° F. and a compressor discharge pressure of 900° F. results in a blade temperature of approximately 1365° F., computed as follows: $1365 = (0.31)(2400) + (0.69)(900)$.

Once blade temperature is known, the blade thermal displacement is computed in block 192. Blade thermal displacement is added in summer 179 to blade elastic growth, and the output, on line 194, is termed the Rapid Rotor Displacement, RRD. The output is termed "rapid" because it occurs almost instantaneously: the centrifugal displacement, produced by summer 173, is immediate, and the blade thermal growth, produced by block 192, is virtually immediate, chiefly because of the large surface area of the blade which is exposed to the two airflows 14 and 185 in FIG. 2A. The RRD signal, on line 194, is fed to summer 202, and also to computational blocks in other figures which will later be discussed.

The third component of the total rotor growth is the thermal displacement of the disk 45A in FIG. 1. Details of the computation of this displacement are given in section (B)(1), immediately below. However, for purposes of FIG. 5, it is sufficient to observe that the thermal displacement of the disc 45A in FIG. 1 (i.e., the change in diameter), which is carried on line 199, is added to the RRD signal in summer 202.

The output 207 of the summer 202, which is also shown in FIG. 4, thus gives the sum of the three components, and provides the total displacement of the tips 205 of the turbine blades in FIG. 1A which will exist at steady state under the conditions indicated by the parameters on lines 104 and 181-183 in FIG. 4.

This computation of rotor displacement just discussed has been based on steady state conditions of the engine. When engine transients occur, the displacement will be computed by block 107 in a manner which accounts for the deviation from steady state, as will be later discussed.

Figure 6:
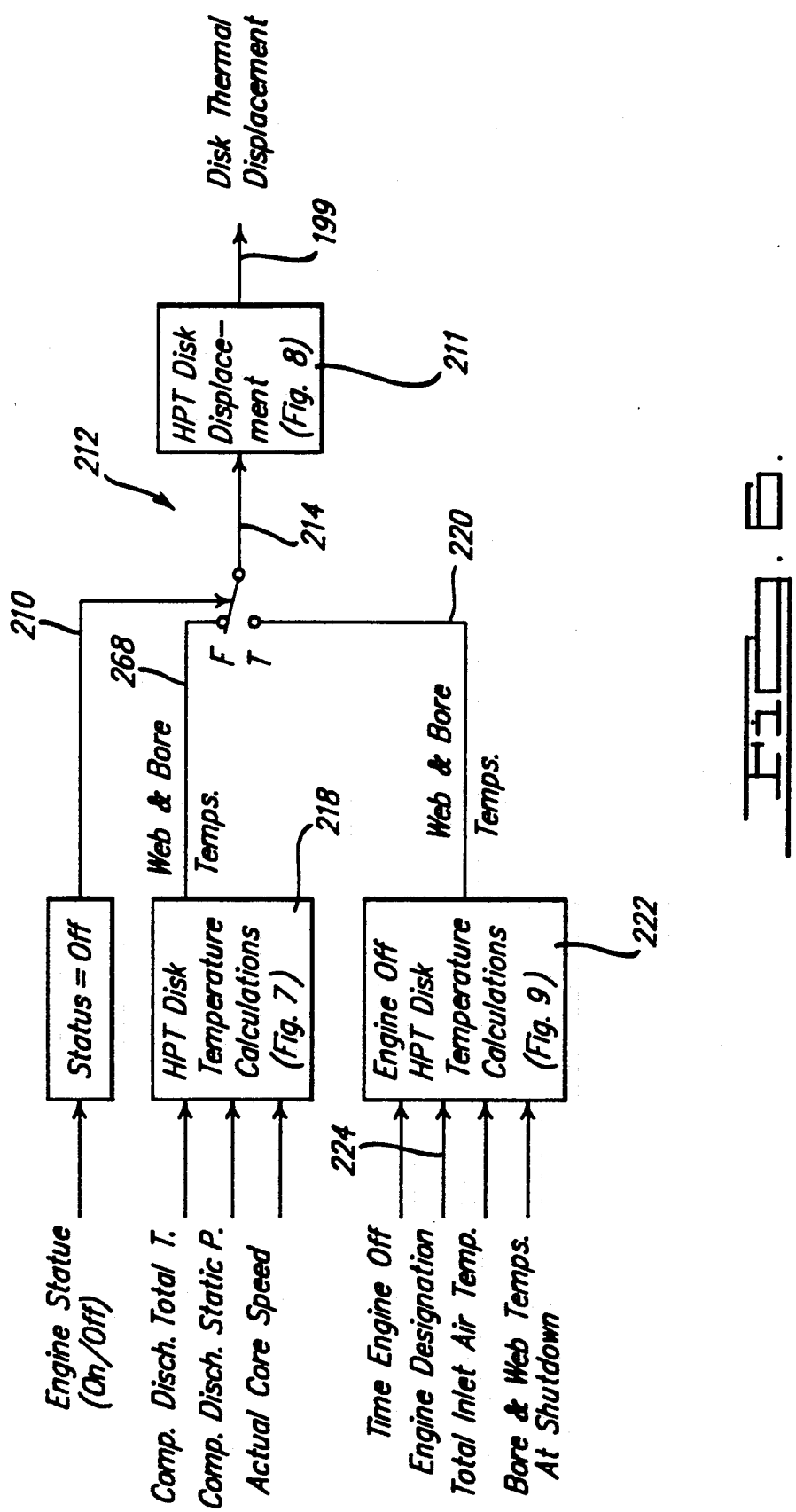

The details of the computation of block 209 in FIG. 5, concerning rotor thermal displacement, will now be considered with reference to FIG. 6.

(B)(1) HPT Disc Thermal Displacement (FIG. 6)

In FIG. 6, block 211 computes disc displacement based on disc temperature, which is supplied on line 214. The temperature is computed in two different ways, depending upon whether the engine is running or not. When the engine is running, the disc is located within a hot environment, and the computation used is that of block 218. On the other hand, when the engine is not running, the disc is not in such a hot environment, but is losing heat, and the computation used is that of block 222. "Disc" refers to component 45A in FIG. 1, and does not include the turbine blades 36 in FIGS. 1 and 2.

Whether the engine is running or not is found from an engine status indicator, carried on line 210 and supplied by an engine fuel control, known in the art. The status indicator controls a switch 212 which determines which type of computation is fed to the disc displacement block 211. (Both computations are undertaken during each computational iteration, but only the one selected by switch 212 is sent to block 211.)

The switch 212 is in the false position in FIG. 6, meaning that the engine is running, and so the temperature signal reaching line 214 is that produced by block 218, which will now be explained.

Figure 7:
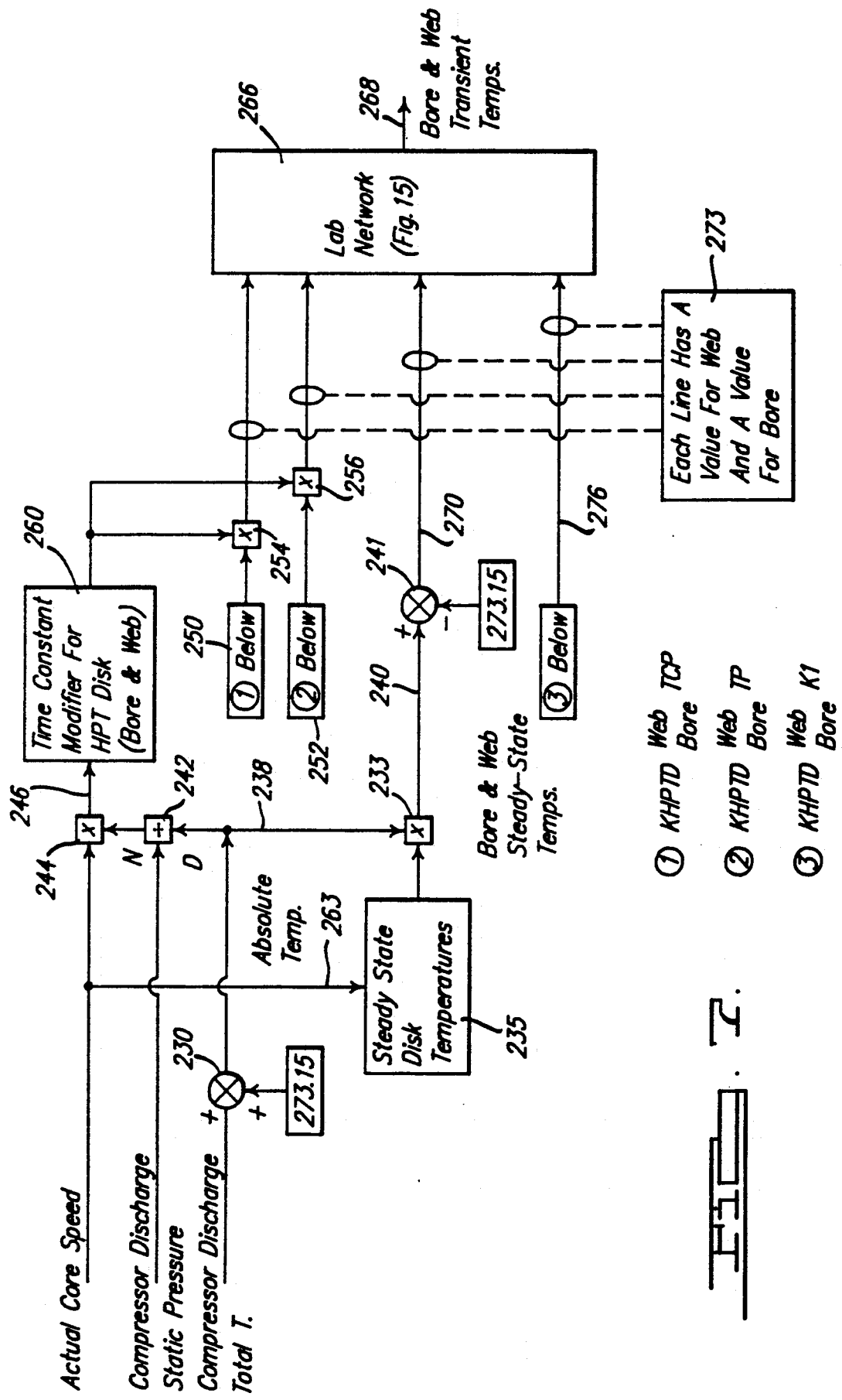

(B)(1)(i) HPT Disc Temperature, Running Case (FIG. 7)

Block 218 in FIG. 6 is shown in more detail in FIG. 7. In FIG. 7, the disk temperature which would be attained at steady state, if the core speed and compressor discharge temperature continue at their present values, is computed by block 235 and multiplier 233. Core speed is supplied on line 263, and compressor discharge total temperature is supplied on line 238. (The temperature is converted to degrees Kelvin in summer 230.) While a single line 240 is shown, the data computed are actually two temperature signals, one for each of two parts of the disc, namely, a bore and a web. Only one line 240 is shown for simplicity. The reason for dividing the disc into a bore and a web will now be explained.

FIG. 35 shows a turbine rotor 45. One region is the web 45B and the other region is the bore 45C. As indicated in the Figure, if the diameter of the disk 45 (exclusive of blades 36) is 100 units, the bore is considered to run between 0 and 40 units, while the web is considered to run from 40 to 100 units.

The bore and the web have different geometries, so that, despite the fact that they are constructed of the same material, at a given environmental temperature, the thermal displacement of the bore radius will be different than the thermal displacement of the web radius. A simpler example will illustrate the principle involved.

A cube and a long rod, of length ten times the length of one side of the cube, are considered. Both are constructed of the same material. If both are raised to the same temperature, the elongation of the long rod will be greater than the elongation of one side of the cube. Similarly, the thermal displacement of the bore and web will be different, and the web and bore are treated differently in the computations of FIG. 7.

The computed steady-state temperatures of the bore and web are fed to a lag network 266 on line 270, after re-conversion to degrees centigrade in summer 241. If steady state operation is maintained, the lag network 266 provides, on output 268, the temperature on line 270 without change.

However, during non-steady state operation (i.e., during transients) the lag network 266 serves to estimate the bore and web temperatures. While the operation of the lag network is described later in detail, the operation of multipliers 254 and 256, which provide two time constants to the lag network, will now be discussed.

The time constants, contained in blocks 250 and 252, are specific to the bore and web, and are used by the lag network to estimate how fast the bore and web each gain or lose heat.

Further, the time constants are not actually "constant," but they change as engine operating point changes, and the changes to the time constants are made in multipliers 254 and 256.

The time constants are used in a second order mathematical model which describes the heat transfer behavior of the disc (as well as such behavior of other components, as later discussed) during engine transients. By "second order" is meant that a graphical plot of the thermal behavior of the disc can be viewed as the combination S of two separate plots P1 and P2, as shown in FIG. 36. Each separate plot has its own time constant, which is the respective constant in block 250 or 252.

The changes in engine operating point, which affect the time constants, are inferred from an engine power parameter, on line 246, which is a term comprising actual core speed, as indicated, multiplied by the quotient of compressor discharge static pressure divided by compressor discharge total temperature. That is, the power parameter is of the form of (N)(P/T), wherein N is core speed, P is compressor discharge pressure, and T is compressor discharge temperature. The parameter indicates, in a general way, the present output power of the engine.

A simplified explanation of the reason why the time constants of blocks 254 and 256 depend upon the power parameter on line 246 is the following. Core speed indicates the speed of rotation of the disc 45A in FIG. 1, and thus indicates how much scrubbing of the disc occurs by the air surrounding it. Greater scrubbing promotes greater heat transfer, just as waving a hot spoon in the air promotes cooling of the spoon. Thus, it is clear that the time constants should depend upon core speed, which is part of the power parameter.

The time constants also depend upon pressure and temperature of the medium surrounding the disc, because a hot, dense medium promotes heating of the disc better than does a warm, dense medium, which, in turn, heats the disc faster than does a warm, less dense medium. Thus, it is clear that the time constants should also depend upon the compressor discharge temperature and pressure, which influence the pressure and temperature of the cavity containing the disc.

Therefore, in FIG. 7, the steady-state disc temperatures (i.e. those of the bore and web) are supplied to the lag network 266 on line 270. The lag network, as will be later explained, delivers these identical temperatures to its output 268 if steady state operation persists. In such a case, the time constants produced by multipliers 254 and 256 are not used. However, if a transient does occur, the time constants are used to modify the steady state temperatures, as will be later explained.

Three important features relating to FIG. 7 are the following. One, the disc has been divided into two components, namely, a bore and a web. There are two time constants (one in block 250 and one in block 252) for each component, giving a total of four time constants for the disc.

Two, as the sign 273 indicates, each line feeding the lag network 266 represents two pieces of data, one for the web and one for the bore.

Three, the temperature signal on line 238 provides an implicit correction for altitude: ambient temperature changes as altitude changes, causing compressor discharge temperature to change, thus affecting disc temperature by virtue of multiplier 233.

The steady state bore and web temperatures on line 240 are modified during engine transients (i.e., during non-steady state conditions) by the lag network 266, which is explained below in connection with FIG. 15. However, prior to discussions of transient temperatures, FIG. 8 will first be considered, which computes disk displacement based upon both the hub and web temperatures carried on line 268 in FIG. 7.

Figures 8, 9:
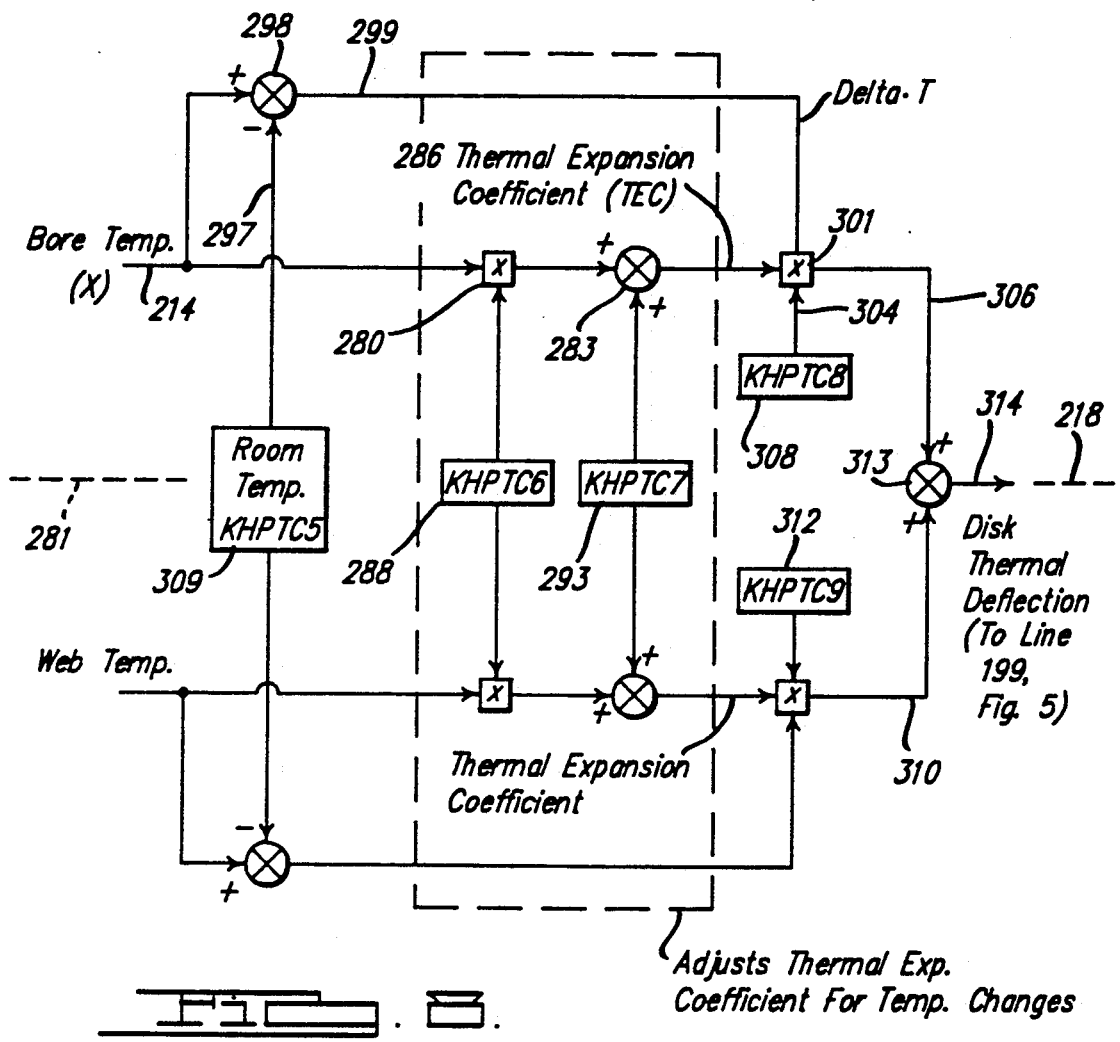

It is to be noted that the disc displacement computation of FIG. 8 is used not only when the engine is running, both at steady state and during transients, but also when the engine is not running, although the transient and non-running situations have not yet been discussed.

(B)(2) HPT Disc Displacement (FIG. 8)

The temperatures produced by the lag network 266 in FIG. 7 (or line 220 in FIG. 6, as later discussed) are fed to line 214 in FIG. 6, which leads to the disc displacement block 211, which will now be explained with reference to FIG. 8.

FIG. 8 is symmetrical about line 281, and so the explanation given for bore deflection computations, which occur above the line, is the same for those concerning web computations, which occur below the line.

In simplified terms, FIG. 8 finds the increase in length of an object (i.e., web or bore) by multiplying the length (in block 308) which exists at a reference temperature (in block 309) by both (a) the deviation from the reference temperature (on line 299) and by (b) the thermal expansion coefficient of the object. That is, the increase in length equals $$(T1-T2) \times (\text{expansion coefficient}) \times (\text{original length}),$$

wherein T1 is actual temperature and T2 is the reference temperature.

This computation is explained in greater detail as follows. The bore temperature, which is that on line 268 in FIG. 7 and which, during steady-state operation, is the same as that on line 270, is fed to multiplier 280 in FIG. 8. The multiplier 280, together with the adjacent summer 283, adjust a thermal expansion coefficient (TEC), based on temperature changes of the material for which the coefficient has been derived, and can be explained by reference to FIG. 37.

FIG. 37 shows a straight line 281A described by an equation of the form $Y = Mx + B$. The symbol M represents the slope of the line, and B is the Y-intercept, indicated by point 281B. In FIG. 8, M is the constant contained in the block 288 and B is the constant contained in block 293. Thus, if X (i.e., temperature) is the input to multiplier 280 as indicated, the output of summer 283, on line 286, represents $MX + B$. This output represents the thermal expansion coefficient (TEC) of the bore material, but adjusted for bore temperature. The adjustment is linear, based on the straight line 281A in FIG. 37, but using the constants of blocks 288 and 293 as M and B.

The thermal expansion coefficient, after adjustment, is multiplied in multiplier 301 in FIG. 8 by the deviation (DELTA-T) of actual bore temperature, on line 214, from room temperature (or other reference temperature), on line 297. The deviation is supplied to multiplier 301 on line 299. Multiplier 301 further multiplies the TEC and DELTA-T by a reference radius of the disc, provided on line 304. The reference radius represents the radius of a reference point 318 on the disc, as shown in FIG. 35.

FIG. 8 computes the displacement 319 in FIG. 35 (shown greatly exaggerated) of the reference point 318, which is caused by temperature changes, and provides the displacement on line 306.

An identical computation is undertaken for the web, and is done below line 281. A similar reference point 318B in FIG. 35 for the web is provided by block 312 in FIG. 8, and so line 310 provides a signal indicative of displacement 318C of the web reference point.

The output of summer 313 in FIG. 8 indicates the sum of bore and web displacements, and thus indicates the thermal displacement of the disc 45A.

The preceding discussion has considered the computation of disc displacements for a running engine. However, if the status signal on line 210 in FIG. 6 indicates that the engine is not running, the computation used is that of block 222, which is provided to line 214 by switch 212. Block 222 computes disc temperature based on both the length of time the engine has bee shut down and the disc temperature at the time of shut-down. This computation will now be considered.

(B)(1)(ii) HPT Disc Temperature, Non-Running Case (FIGS. 6 and 9)

Block 222 in FIG. 6 receives four inputs, one of which is an engine designation on line 224. This designation is, in effect, a serial number which identifies the engine. This serial number is provided by the electronic fuel control (not shown) of the engine, in a manner known in the art. Thus, block 222 is informed of the identity of the engine with which block 222 has been previously associated. One reason for providing this designation number is the following.

It is possible that the clearance control hardware, which includes the invention described herein, has been replaced by new control hardware. In such a case, the new control, using block 222, will notice a change in the designation number on line 224. (The invention constantly inquires whether the engine designation number remains the same.) When the new engine designation is recognized, as indicated by the symbol T in FIG. 9, then the web and bore temperatures on line 220 in FIG. 6 are set to a default value, namely, the constant KHPTC19, in FIG. 19, which is 150° C.

One reason for this setting to a default value is that the new clearance control hardware does not know the length of time elapsed since the engine has been shut down, nor the disc temperatures at shut-down, and so cannot estimate disc temperature based on shut-down temperature and lapse of time.

Instead, a default value of 150° C. is chosen. This value is considered acceptable because it is near the temperature of a running disc, so that problems similar to those of a hot rotor reburst will not be encountered. That is, the clearance control assumes, by default, that a hot disc is present when the control hardware is changed, irrespective of the actual temperature of the disc, and irrespective of the actual length of time the disc has been cooling.

If, on the other hand, the designation parameter just discussed indicates that no change in control hardware has occurred, then the disc temperature is computed according to the following expression of FIG. 9:

$$\text{Temp} = (\text{TOLD} - \text{TREF})[\exp(-\text{TIMEOFF}/\text{TIMECONST})] + \text{TREF}$$

wherein

Temp refers to the disc temperature;

TOLD refers to disc temperature at shut-down;

TREF refers to a reference temperature which is approximately equal to ambient temperature (thus, TOLD−TREF equals the temperature rise of the disc);

EXP refers to the Napierian log base, namely, e;

TIMEOFF refers to the length of time the engine has been shut down; and

TIMECONST refers to the respective time constant, given in FIG. 19, for the bore (KHPTDBORETSD) or the web (KHPTDWEBTSD).

The preceding computation is done twice: once for the web and once for the bore. Both computations, as the expression indicates, are types of exponential decay functions. An exemplary computation is now given.

As FIG. 19 indicates, the time constant (KHPTDBORETSD) for the bore is 438 minutes, while that for the web (KHPTDWEBTSD) is 375 minutes. Therefore, if the difference, C, then the estimated temperature for the web after 750 minutes (i.e., after two time constants have elapsed) will be about 165 degrees computed as follows.

$$165 = 1000 \exp(-750/375) + 30$$

The temperatures computed by block 222 in FIG. 6, as just described, for both the bore and web, are fed to block 211, which computes the actual disk displacement, as described above under the heading "(B)(1) HPT Disc Thermal Displacement (FIG. 6)". This disk thermal displacement is one of the three components of rotor growth, and is added on line 199 in FIG. 5 to RRD in summer 202, as stated above.

The preceding discussion has explained the computation of rotor displacement undertaken by block 107 in FIG. 4. This displacement is fed to summer 120, which also receives a desired clearance from block 101, in order to produce a desired casing displacement. The desired clearance computation will now be considered, with reference to FIG. 18.

Figures 17, 18:
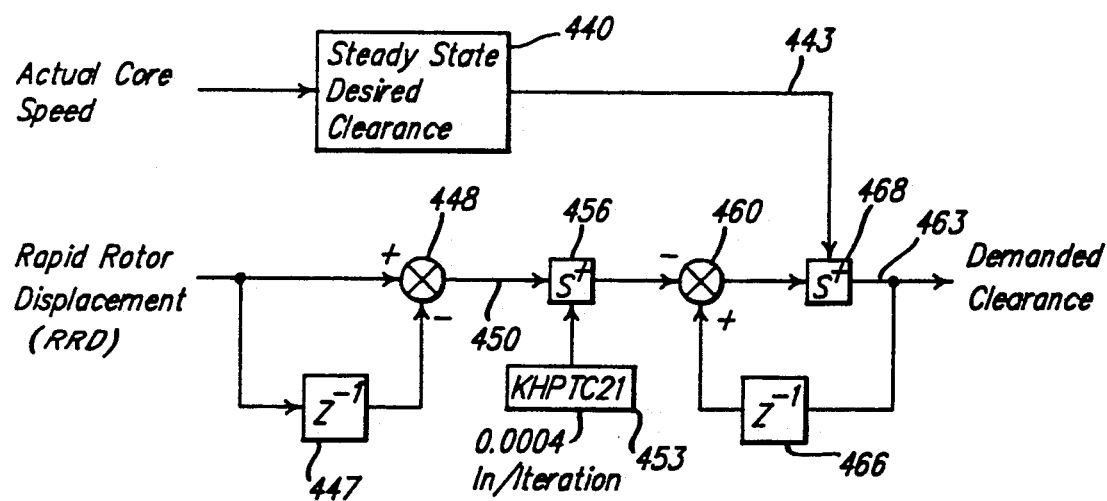

(C) Desired Clearance Computation (FIG. 18)

In FIG. 18, block 440 produces a desired steady state clearance 33 in FIG. 2 in response to core speed. An example will illustrate the operation of the remainder of FIG. 18.

Assume that the desired clearance, on line 443, is 0.010 inch (i.e., 10 mils.) At steady state, rapid rotor displacement (RRD, which is the sum of blade thermal displacement and rotor centrifugal displacement on line 194 in FIG. 5, as discussed above) attains some finite value, which is stable, such as 15 mils. Z-block 447 in FIG. 18 applies the last previous value of RRD to summer 448, and so, as long as RRD remains constant, the output of summer 448, on line 450, is zero. (15 mils is subtracted from 15 mils in this example.) MAX selector 456 selects the greater of the signal on line 450 (now zero) or the constant in block 453. As FIG. 19 indicates, the constant has a value of 0.0004 inch/iteration, so, at this time, MAX select block 456 selects 0.0004 and applies this value to summer 460.

Summer 460 also receives the last value on line 463 from Z-block 466. MAX select block 468 selects the greater of (a) the output of summer 460 or (b) the signal on line 443. In this example, the signal on line 463 is 10 mils, so the output of summer 460 is (0.010-0.0004), or 0.0096, which is 9.6 mils. Accordingly, MAX select block 468 selects the signal on line 443 and applies it to line 463. Therefore, the output, on line 463 is equal to the steady state desired clearance provided by block 440 so long as steady state persists.

When a transient occurs, the same output signal may or may not be provided, as will now be explained. Assume that core speed increases. RRD now jumps. Assuming that RRD jumps to 20 mils, the signal on line 450 in FIG. 18 now jumps to 5 mils (20−15). Max select block 456 selects this value over the alternative of 0.0004, and applies 5 mils to summer 460, which subtracts this value from the previous, steady state value on line 463.

One way to visualize the meaning of this subtraction is given in FIG. 38. A blade 36 and casing 39 are shown in their steady state conditions. Since the condition is steady state, clearance 486 will equal the demanded clearance on line 463 in FIG. 18. When core speed jumps, RRD increases as indicated by distance 489 in FIG. 38, which corresponds to the value on line 450 in FIG. 18. Summer 460 takes the difference between the steady state clearance (distance 486 in FIG. 38), which is produced by Z-block 466, and the increase in RRD (distance 489 in FIG. 38). This difference 492 is the remaining clearance in the turbine after the jump in RRD.

MAX selector 468 chooses the larger of this remaining clearance 492 in FIG. 38, or the scheduled clearance for the new, higher core speed (from block 440 in FIG. 18). (In general, the desired clearance of block 440 decreases as core speed increases.) As a result, the clearance demanded on line 463 will be equal to, or less than, the previous steady state clearance. Further, the value on line 463 will not decrease faster than RRD increases, provided that the increase in RRD is less than the limiting value in block 453. The effect of this new demanded clearance will be explained with reference to FIG. 4.

The reader is reminded that clearance is controlled only by cooling, and thus shrinking, the casing 39. Removal of the cooling air, as by closing the valve 185 in FIG. 1A, allows the casing 39 to expand as the turbine gases 14 heat it. Reduction of the desired clearance value, produced by block in FIG. 4, causes demanded casing displacement (on line 121) to decrease, which causes casing error to decrease, which causes the cooling valve to restrict flow or shut off completely. The effect is to allow the casing to expand during accelerations to make room for the growing turbine. This effect is important during the occurrence of a hot rotor reburst, which was discussed in The Background of the Invention.

However, after the acceleration has terminated, RRD in FIG. 18 acquires a steady state value, which drives the output of summer 448 to zero. Thus, MAX selector 456 selects the constant in block 453, and applies it to summer 460. The desired clearance on line 443 reaches its final, lower value, because the acceleration has terminated, but core speed is now higher. (The reader is reminded that desired clearance decreases as core speed increases). Thus, since the previous value on line 463 is less than the value on line 443 (because MAX select block 468 previously selected the greater of the output of summer 460 or the signal on line 443, and the signal on line 443 has since diminished in value), the effect of summer 460 and MAX select block 468 is to decrement the demanded clearance, on line 463, in steps of 0.0004 to the new, lower clearance which is proper at the higher core speed.

The preceding discussion has shown three major functions of the apparatus of FIG. 18. First, during steady state operation, the desired clearance of block 440 appears on output line 463. Second, during an acceleration, the demanded clearance is reduced such that the cooling valve in FIG. 1A restricts or closes entirely, thus allowing the casing 39 to grow and clear the growing rotor. Third, upon termination of the acceleration, the output signal on line 463 is gradually brought to the steady state value on line 443, in increments of 0.0004, which increment is the constant in block 453.

The demanded clearance is applied to summer 120 in FIG. 4, together with the rotor displacement, as described above, to produce the demanded casing displacement, on line 121. The constant, K1, is subtracted in the summer 120, as will now be explained.

K1 is a pre-existing clearance which is built into the engine during manufacture. In general, K1 will vary between 0.060 and 0.080 inches. If the components in FIG. 38 are cold, dimension 486 would represent K1.

When a blade grows to phantom position 36P, the desired clearance from block 101, when added in summer 120, indicates that the casing 39 should be at point 480. However, the cold clearance, 486 (i.e., K1), provides a pre-existing clearance, and is subtracted from point 480 in determining the demanded casing displacement. The subtraction indicates that the casing 39 need only move by distance 482 to attain the desired clearance.

The output of summer 120 in FIG. 4 indicates the demanded casing displacement. Actual casing displacement is subtracted from this in summer 123 in order to provide the casing error. The casing displacement computations will now be discussed.

Figure 10:
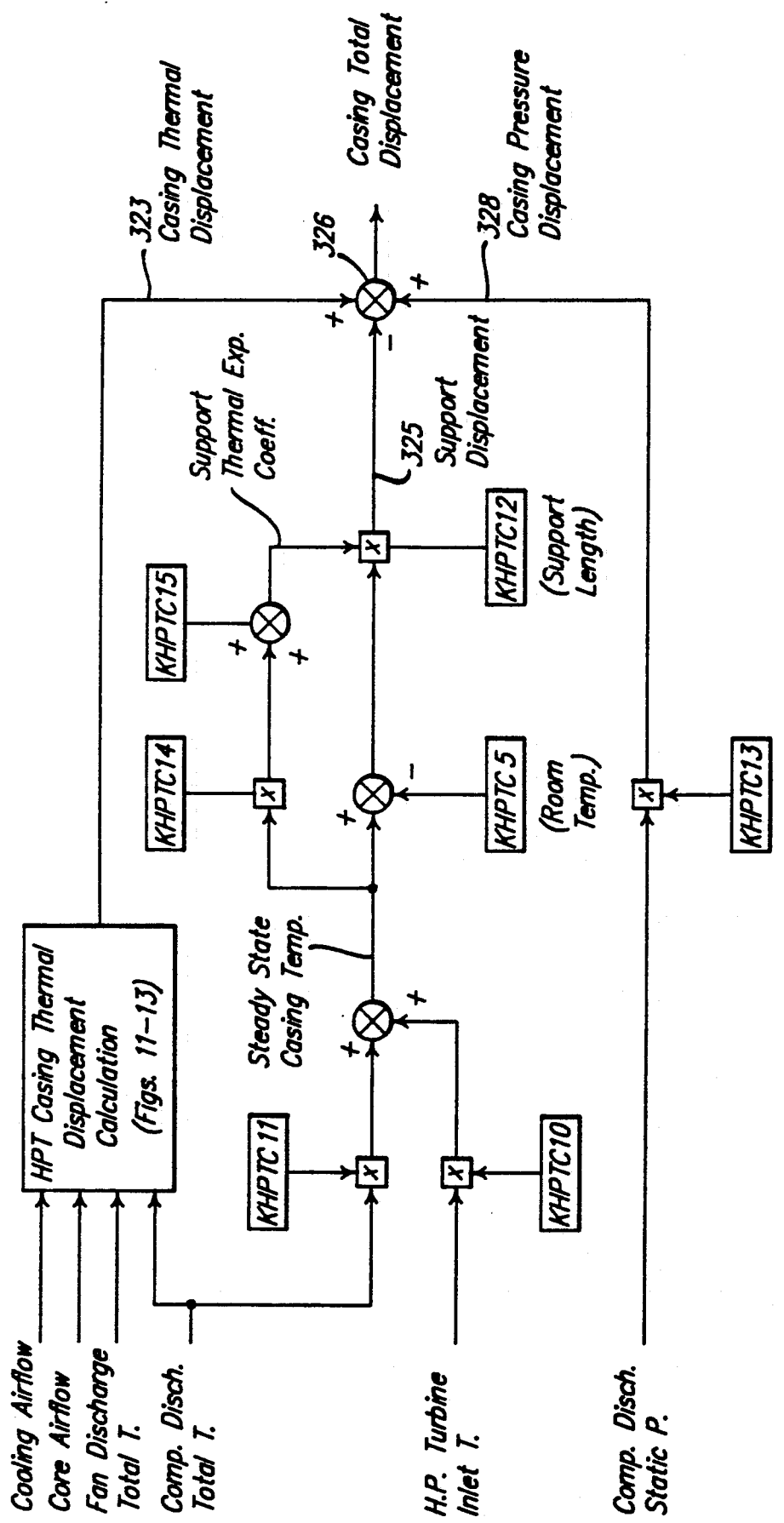

(D) HPT Casing Temperature (FIG. 10)

In brief, casing displacement is divided into three components, the superposition of which give the total casing displacement. The three components are, first, thermal displacement, on line 323 in FIG. 10; second, pressure displacement, on line 328; and, third, thermal displacement of the supports of the casing, on line 325. (Casing support displacement is subtracted in summer 326 because expansion of the supports, such as supports 430 in FIG. 3A, serves to decrease casing diameter, while expansion of the casing itself serves to increase casing diameter.)

The thermal displacement computations will now be considered in detail. Block 320 in FIG. 10 receives four inputs 329, and from them computes the deviation in casing diameter from its cold state. This computation is described in more detail in FIGS. 11-13.

Figure 11:
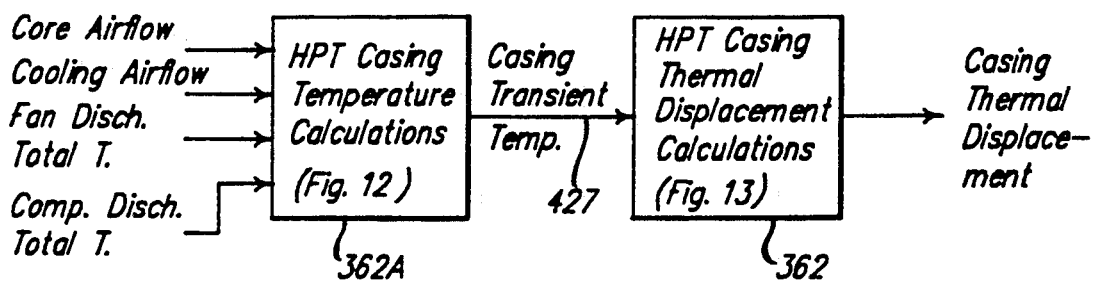
Figure 12:
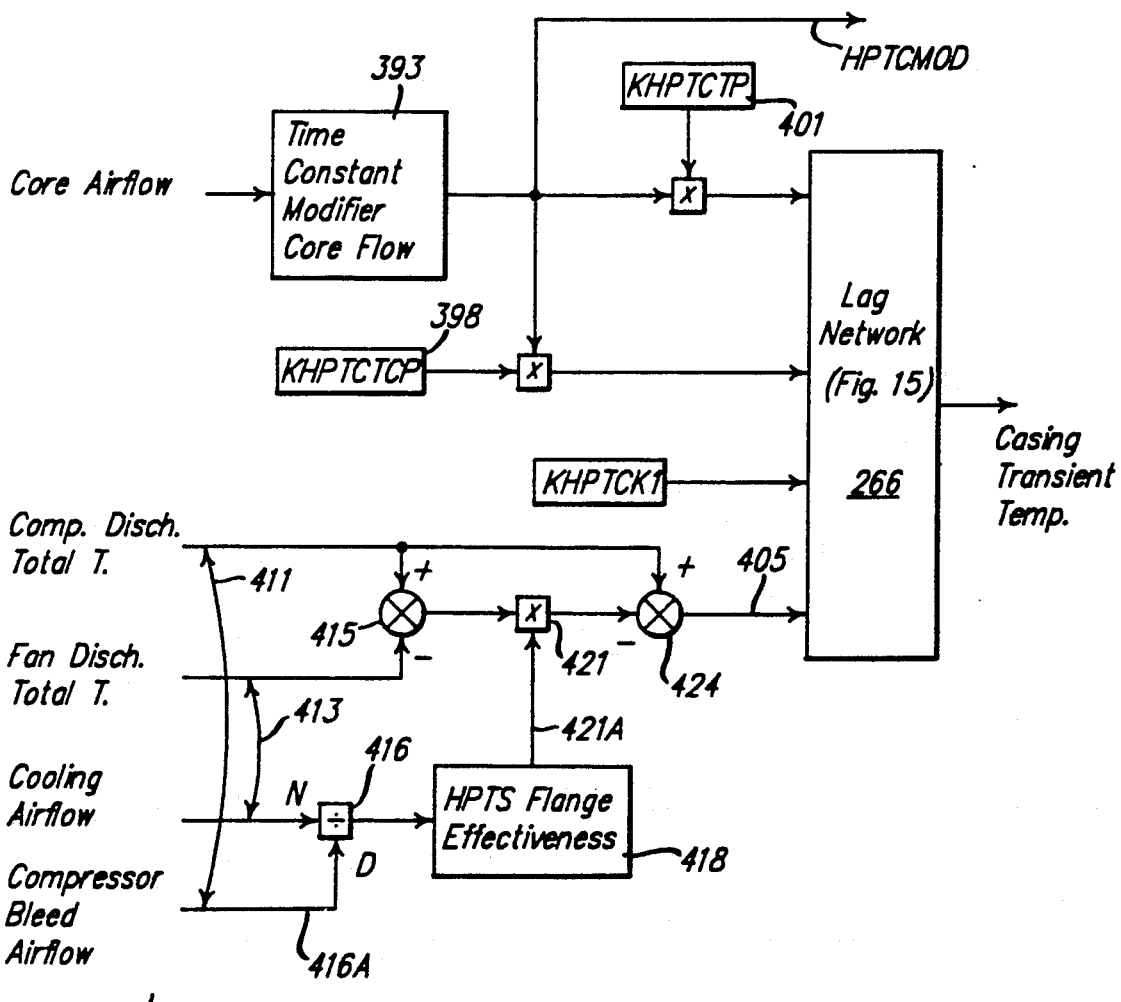

As FIG. 11 indicates, casing temperature is first computed, and then thermal displacement is computed based on that temperature. The temperature computation is further detailed in FIG. 12. As with the rotor, FIG. 12 illustrates two time constants, in blocks 398 and 401, because the heat transfer model of the casing is also of the second-order type. Further, as with the rotor, each time constant is not in fact constant, but is modified by block 393 according to core air flow, which is the amount of air, in pounds per second, traveling through the casing, and which is indicated by arrow 14 in FIG. 1A.

One reason for modifying the time constants according to core flow (or "through flow") is analogous to that given for modifying the time constants of FIG. 7 for the rotor. The rate of heat transfer from the casing 39 in FIG. 1 is related to the temperature and density of the medium in contact with the casing, and this medium is the airstream 14. Although core airflow is a single parameter, this single parameter contains information regarding the heat transfer properties of the airstream 14, in a roughly similar way that the power parameter, on line 246 in FIG. 7, contains information about the heat transfer properties of the medium contacting the disc.

For example, in general, at high core flows, the temperature of the airstream 14 is hot, the pressure (i.e., the density) is high, and the velocity is high. At low air flows, the temperature is lower, the pressure is lower, and the velocity is lower. Therefore, knowledge of the core flow by block 393 allows one to compute the rate of heat delivery to and from the casing, which affects the time constants of the casing.

The steady state temperature of the casing is provided on line 405 in FIG. 12, and is computed based on parameters 407, which include compressor discharge total temperature and fan discharge total temperature. In addition, a signal on line 421A indicates the relative mass flows of the two airstreams having these two temperatures. Compressor discharge air is used to cool the casing 39 and the shroud supports 430, and flows roughly as indicated by arrows 431. The fan cooling airflow is indicated by arrows 97, and is delivered by a plenum 98 shown in heavy outline.

Figure 3:
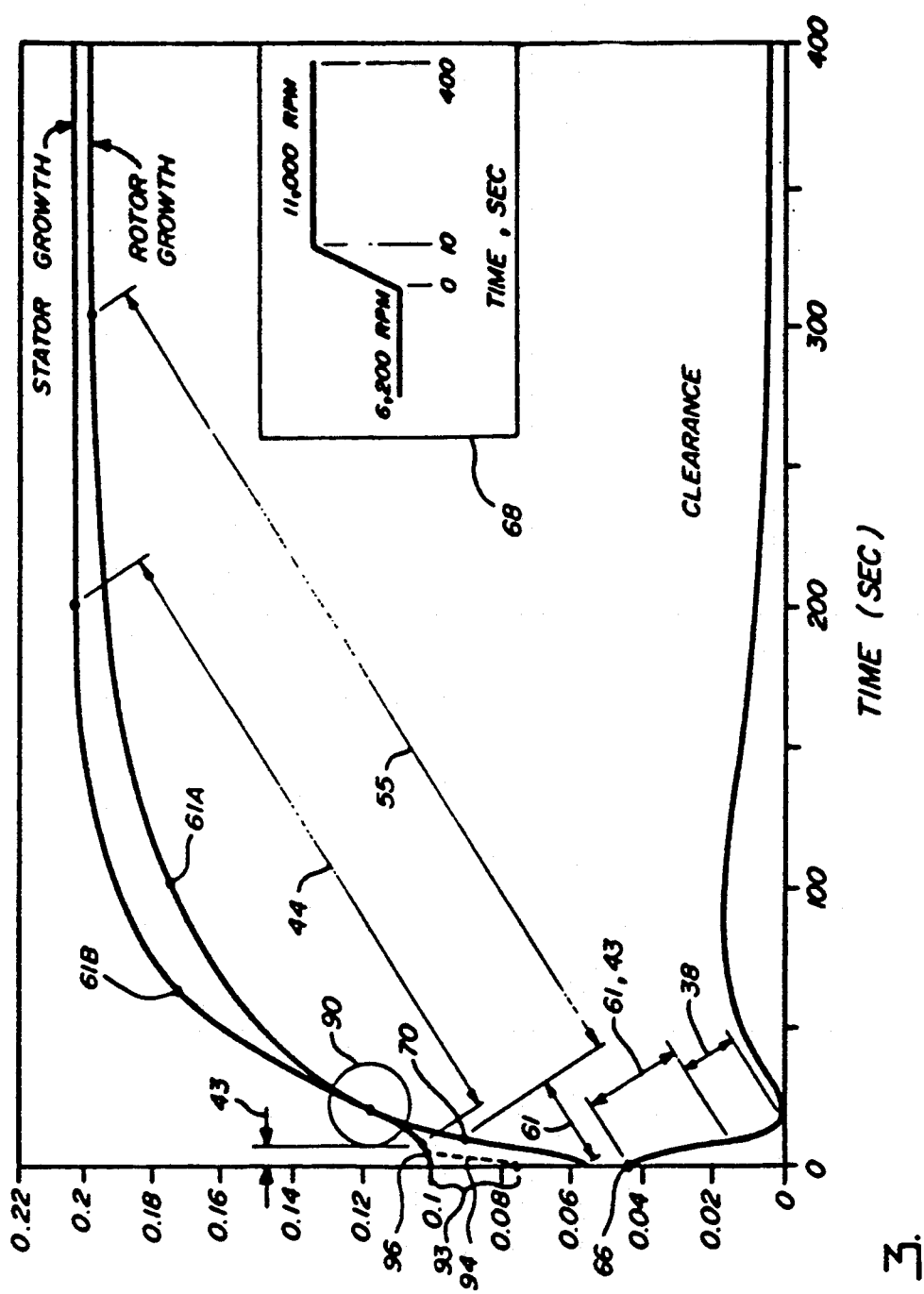
FIG. 3 illustrates a plot of clearance 33 in FIG. 2 versus time.

Block 418 in FIG. 12 contains a factor, known from the design of the compressor bleed, which, when applied to the flow ratio provided by dividing block 416, gives the scaling that defines the effectiveness of the two airflows 431 and 97 on the casing in FIG. 3.

Stated another way, the apparatus leading to line 405 in FIG. 12 gives the temperature of the fan bleed airflow 97 in FIG. 3A, together with the temperature of the compressor bleed airflow 431. Block 418 further contains information, known from the design of the casing 39, as to the heat transfer properties of the casing and associated structures. Knowledge of the preceding information allows one to calculate the temperature of the casing.

More generally, line 405 represents an interpolation between the two airflows at two different temperatures. First, the temperature difference is obtained from summer 415, the difference is weighted by multiplier 421, and the weighted difference is subtracted from the hotter temperature in summer 424.

The weighting done in multiplier 421 is based on the ratio of mass flows, given in divider block 416, and also based on the flange effectiveness, given in block 418. The latter is known in heat transfer theory, and is an indication of the thermal insulative value of the components located between the heating and cooling airflows. The components in FIG. 3A include the casing 39, flanges 431A, as well as the casing supports 430.

The preceding discussion has considered the computation of steady state casing temperature. This temperature, like the steady state rotor temperature of FIG. 7, is applied to the lag network 266 in FIG. 12, together with the time constants proper for the casing, and the output, on line 427, indicates casing temperature. At steady state, the output equals the steady state temperature on line 405. During transients, the output is modified by the lag network and the time constants. The use of the casing temperature to compute casing displacement will now be considered.

Figure 13:
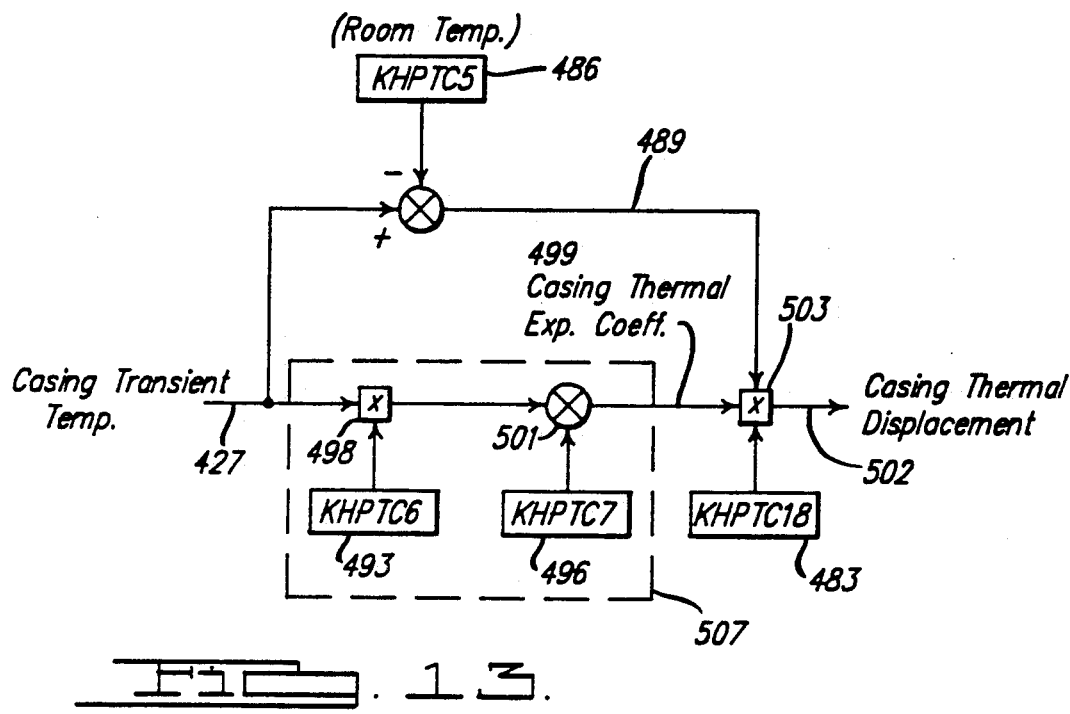

(E) HPT Casing Displacement (FIGS. 11 and 13).

FIG. 11 indicates that casing temperature, on line 427, is fed to block 362, which computes casing displacement. The computation is detailed in FIG. 13.

As in FIG. 8, casing displacement, on line 502 in FIG. 13, is computed based on a dimension (in box 483) which exists at room temperature (in box 486), and the dimension is multiplied by both the deviation from room temperature (on line 489) and by the coefficient of thermal expansion (on line 499).

As described above in connection with FIG. 37, blocks 493 and 496 in FIG. 13, together with multiplier 498 and summer 501, adjust the coefficient of thermal expansion based on the temperature on line 427. The adjusted coefficient is multiplied by the deviation from room temperature (or other reference temperature) in multiplier 503, wherein the room temperature dimension of the casing (in block 483) is also multiplied. The product, on line 502, is the thermal displacement of the casing, and is of the form of (thermal expansion coefficient)×(temperature deviation)×(initial size). The casing thermal displacement is applied to summer 123 in FIG. 4, from which casing error is provided.

(F) Cooling Airflow Computation

The computation of the amount of cooling airflow which is fed to divider 416 in FIG. 12 will now be considered. This computation is done in block 138 in FIG. 4, which is shown in detail in FIG. 14. The output of divider 520 is the pressure ratio between the fan discharge, at point 523 in FIG. 1A, and the pressure under the cowl, which represents the pressure near point 526, and is calculated based on atmospheric pressure. This pressure ratio is that in the duct 527 which delivers the cooling airflow to the casing 39 when the valve 134 is fully open.

It is known in the art how to calculate the rate of airflow, in pounds per second, in a duct when the pressure ratio (from divider 520), the temperature (on line 529), and the duct geometry is known (geometry factors are in block 531). Thus, the signal on line 533 indicates the maximum cooling flow which can be delivered to the casing 39.

Figure 14:
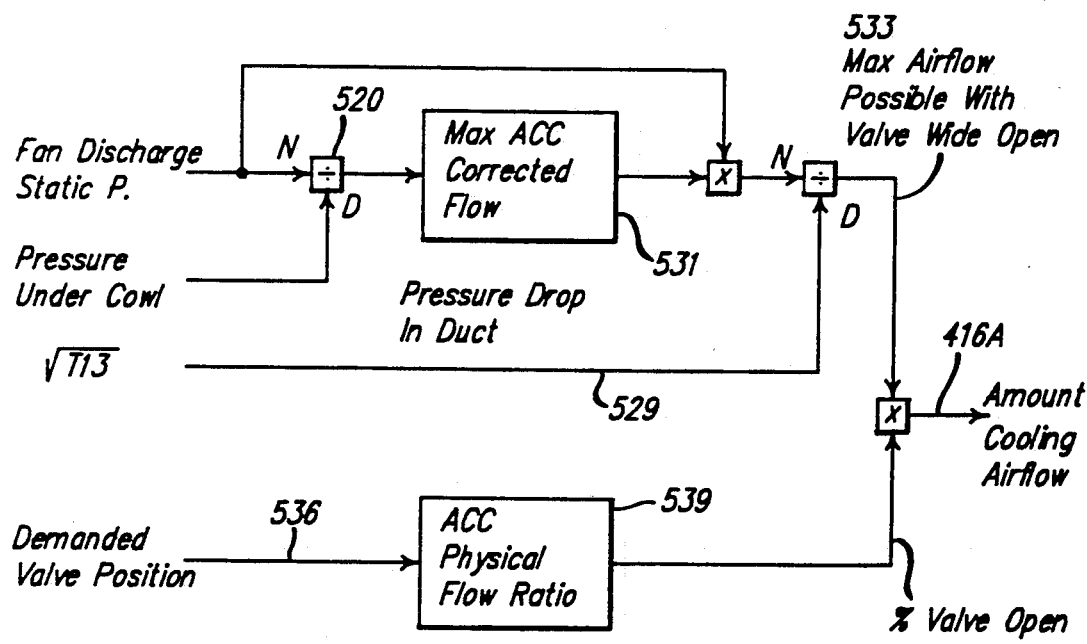

However, the valve 134 in FIG. 1A throttles this flow, and so the actual flow is found from the valve position, on line 536 in FIG. 14, which is corrected in block 539 for non-linearities between valve position and valve aperture. The result, on line 416A in FIGS. 4, 12, and 14, gives the amount of cooling air reaching the casing 39.

This discussion will now consider the temperature lag network of FIGS. 7 and 12, which are both the same, and which adjusts the calculated steady state temperature of the rotor and the casing in order to provide estimated temperatures of the rotor and casing for use during transients.

Figure 15:
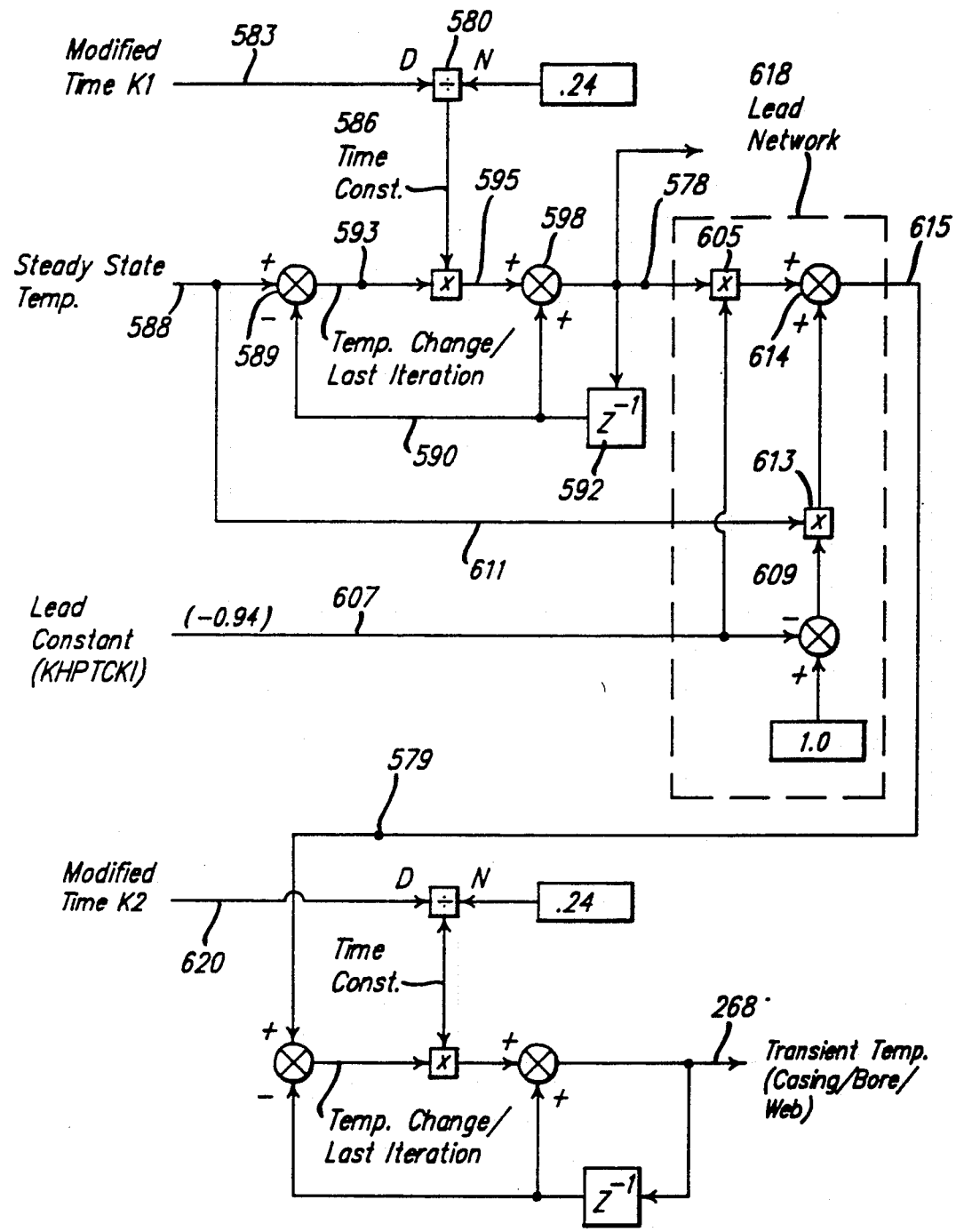

(G) Temperature Lag Network (FIG. 15)

The preceding discussion has considered the computation of casing error, which is fed to the valve regulator 129 of FIG. 4, but during steady state conditions. It will now be explained how the invention functions during engine transients, that is, during accelerations and decelerations, in order to estimate the rotor and casing temperatures based on the behavior of the calculated steady state temperatures. This estimation is accomplished by the lag network 266 indicated in FIGS. 7 and 12. The lag network in FIG. 7 processes both signals for the web and the bore. The lag network of FIG. 12 processes signals for the casing.

The situation of FIG. 12, for the casing, illustrates the functioning of all three situations, and is taken as generally illustrative. The time constants of blocks 398 and 401 are applied in FIG. 15 as indicated. Two lag networks are shown in FIG. 15, and they are identical. The first is upstream of point 578, while the second is downstream of point 579.

In the first network, divider 580 divides the time constant on line 583 by 0.24. The quotient, on line 586, is another time constant, but adjusted for the fact that the iteration time of the computer program is 240 milliseconds. That is, point 578, or any other selected point in the Figures, is reached once every 240 milliseconds during operation of the program. However, the time constant on line 583 is computed in terms of natural seconds, and then is adjusted by divider 580.

The steady state temperature, from line 405 in FIG. 12, is applied to summer 589, wherein Z-block 592 subtracts the last value appearing at point 578, thus providing as the output of this summer, at point 593, the temperature change occurring since the last iteration. This temperature change is multiplied by the time constant of line 586, which is a number between 0 and 1, and the product, on line 595, is added in summer 598, by z-block 592, to the last value at point 578.

This sequence of events adds a lag to the steady state temperature on line 588, as the following example will illustrate.

Let it be assumed that steady state temperature increases from 10, to 15, and then stabilizes at 20 arbitrary units. Let it also be assumed that the time constant on line 586 is 0.5, meaning that the natural time constant, on line 583, is 2.08. When the temperature was stable at 10, the value at point 593 was 0, because the signals on lines 588 and 590 were equal. However, when the temperature jumps to 15, the value at point 593 (the temperature difference) assumes a value of 5 (ie, 15−10).

Multiplier 601 now produces a value of 2.5, which is added in summer 598 to a value of 10 (from z-block 592) to provide a signal of 12.5 at point 578. During the next iteration, the temperature jumps to a value of 20, and summer 589 produces an output of 7.5 (ie, 20.0 minus 12.5). Multiplier 601 takes ½ of this value, and applies the result of 3.75 to summer 598, which adds this number to the number 12.5, giving a value at point 578 of 16.25.

At the next iteration, after temperature has stabilized at 20, the value at point 593 is 3.75 (ie, 20.00 minus 16.25), ½ of which is added to the value of 16.25 at point 578 by multiplier 601 and summer 598, producing 18.125. The process continues, in which the difference between the value point 578 and the steady state temperature (i.e., 20) is divided by two and the added to the value at point 578. Restated, summers 589 and 598, together with multiplier 601, take half the difference between points 578 and 588, and add this half to point 578 each iteration. In this example, the sequence of values at point 578 is 10, 12.5, 16.25, and 18.125.

This process forces the value at point 578 to follow the steady state temperature, on line 588, but with a time lag imposed: the first output value (at point 578) does not immediately adopt the steady state temperature, but gradually approaches the steady state temperature in increments of ½ the present difference. The actual time of the lag is determined by the time constant; if the time constant were 0.1, instead of 0.5 as assumed above, the successive values at point 578 would be 10, 10.5, 10.95, and 11.1, instead of the sequence computed in the paragraph above. Thus, a smaller time constant causes a larger lag and causes the signal at point 578 to take a longer time to reach the final, steady state value. The output of the first lag network, at point 578, will be called a first lag temperature, and is fed to a lead network 618, which will now be explained.

The first lag temperature is multiplied, in multiplier 605, by a constant carried on line 607, which is approximately −0.94, as indicated in FIG. 19. The constant is also subtracted from 1.0 in summer 609 and the result, about 1.94, is multiplied, in multiplier 613, by the steady state temperature carried on line 611. The outputs of multipliers 605 and 613 are added in summer 614, producing a signal carried on line 615. This signal serves as a lead signal which prompts the second lag network as to the behavior of the steady state temperature: the signal equals (1.94×steady state temperature) minus (0.94×first lag temperature), and is thus dominated by the steady state temperature.

The lead signal, on line 615, is applied to a second lag network which begins at point 579. The second lag network has a smaller time constant, on line 620, but otherwise functions the same as the first lag network. Therefore, the output, which is the estimated temperature of a component (casing, bore, or web) during a transient, is subjected to two lag networks as well as to the lead network of box 16. The overall network is a lag-lead-lag network.

The preceding discussion, concerning the high pressure turbine clearance control, has illustrated how rotor and casing displacement are computed for steady state conditions based on core speed, pressures, and temperatures to which the rotor and casing are subjected. Further, the discussion has shown that transient displacement for the rotor and casing, which occur when the engine undergoes accelerations or decelerations, can be estimated, based on the time-behavior of the computed steady state temperatures of these components. These transient computations are undertaken in the lag network 266 in FIGS. 7 and 12.

The time constants in the lag network are modified, during transients, in response to selected operating parameters, such as those feeding block 260 in FIG. 17 and feeding block 393 in FIG. 12. This discussion will now consider the operation of the valve regulator block 129 in FIGS. 4 and 16.

Figure 16:
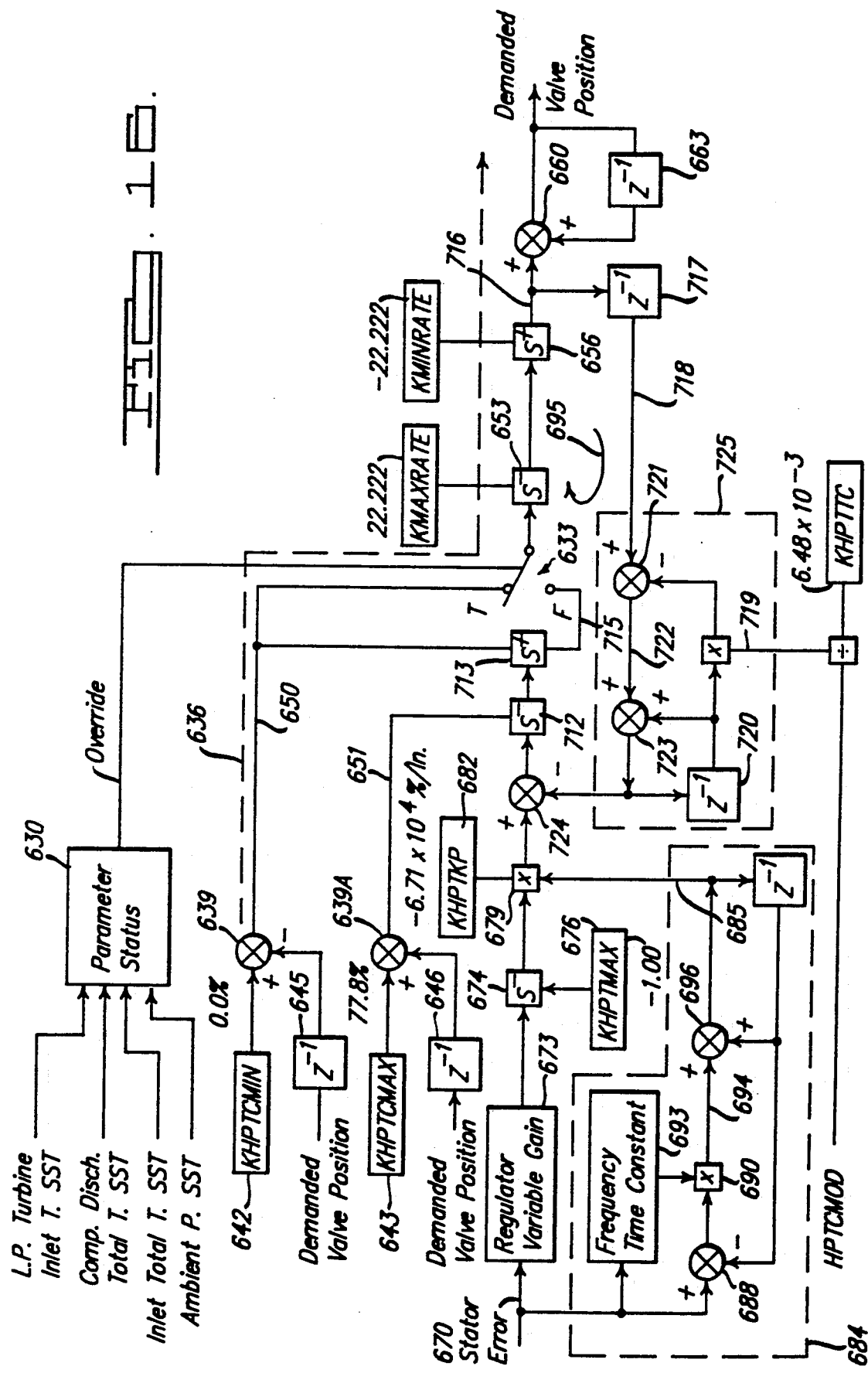

(H) Valve Regulator Dynamics (FIG. 16)

The valve regulator block is shown in more detail in FIG. 16. Information concerning the probable accuracy of selected sensors is fed to a parameter status block 630. The sensors in question are those indicating total air temperature of the air entering the engine, ambient air pressure, compressor discharge temperature, and low pressure turbine inlet temperature. These data concerning sensor accuracy are provided by other apparatus, known in the art. The data for each sensor is a digital signal representing a number. The value of the number indicates the expected degree of accuracy of the data provided by the respective sensor. In the art, these data are termed selection status parameters (SST's).

The SST parameters are applied to a truth table shown in FIG. 17, which represents the operation which block 630 in FIG. 16 performs. In column 700 of FIG. 17, inquiry is made as to whether the SST for the low pressure turbine inlet temperature sensor equals 4 or 7. If the SST equals 4 or 7, the answer is T, meaning true, and, if not, the answer is F, meaning false. In column 701, inquiry is made as to the SST for the sensor for compressor discharge temperature. If the SST equals 4 or 7, the answer is T, while if not, the answer is F. If the answer is indeterminate, that is, the answer is either T or F (a "don't care" condition), an X is provided.

Column 702 inquires whether the SST for the ambient pressure sensors exceeds 13, while column 703 makes a similar inquiry as to the SST of the total air temperature sensor.

The individual values in each row 705–709 are logically ORed together, meaning that inquiry is made as to whether at least one true answer exists in the row, and the result is given in column 704. For example, the true answer contained within circle 710 gives row 707 an OR value of T (ie, True) as indicated in column 704. In contrast, the absence of a true answer in row 709 gives that row an OR value of F, false. The True value indicates that the sensor data are not considered sufficiently reliable, and the control, as explained below, sets valve 134 in FIG. 1 to a fail-safe position.

Based on column 704, the override switch 633 in FIG. 16 is driven to the True position shown when the answer of column 704 in FIG. 17 has a true value. In this situation, the control loop is indicated by dotted line 636 in FIG. 16, and the demanded valve position is provided by summer 639. A cooling valve position of 0%, from block 642, is applied to summer 639, from which is subtracted the previous value of the demanded valve position, provided by z-block 645. The value of the resulting signal, on line 650, is limited by MAX and MIN selectors 653 and 656, which limit the signal between the values of +22.222 and −22.222, as indicated in FIG. 19. The resulting, limited signal, is applied to summer 660 in FIG. 16, to which is added the previous value of the valve signal, provided by z-block 663. Summer 660 and z-block 663 act as an integrator which integrates the signal produced by MAX selector 656. Consequently, valve position is determined by the output of summer 639. No cooling is applied to the casing and, the casing attains its maximum diameter, which is a fail safe position.

If switch 633 is in the False position, indicating that a sufficient number of sensors are believed to be operating reliably, then the stator error signal, on line 670, is processed as follows. The error signal is multiplied by a gain function in block 673. The gain function gives different influence to different values of stator error. For example, an error of 20 mils may cause the output of the gain block to be 50 units, while an error of one mil may cause a disproportionately small output, such as one unit. One result is that the larger error (20 mils) causes a larger response (50 units).

A minimum selector 674 then selects between the minimum of the signal of block 676 and the output of gain block 673, thereby limiting the output of the gain block to an upper most value, namely, that in block 676. The output of the minimum selector 674 is fed to a multiplier 679 wherein it is multiplied by a constant contained in block 682, which converts the error signal to the proper units required for valve positioning. The constant converts the units of stator error (i.e., mils) to units of valve position (i.e., position of a valve poppet or gate) because a given stator error requires a given amount of cooling air, which is provided by a valve having a given poppet position.

Also fed to multiplier 679 is the output of a filter contained in dashed block 684. The filter serves to filter out high frequency noise which may exist in the stator error signal. An example will illustrate the operation of the filter 684.

At steady state, the signals on lines 670 and 685 will be equal. Thus, the output of summer 688 will be zero, and multiplier 690 does nothing to alter the signal on line 685. However, if a jump in stator error occurs, the filter, in effect, inquires whether the jump represents an actual increase in stator error or a spurious noise signal.

Assume that the previous error signal was 10 mils, and that the error signal now jumps to 20 mils. The output of summer 688 is now 10 mils (20−10). Block 693 and multiplier 690 multiply this output by a fraction, which is assumed to be 0.10, thus providing a signal of 1.0 (10×0.10) on line 694, which adds to the previous error signal of 10 mils in summer 696. The result is a signal of 11.0 on line 685, in response to an error signal of 20 mils on line 670: the large error signal has been reduced. If the large error signal persists, the signal on line 685 will gradually approach the value of the error signal. If the large error signal disappears, as it may do if caused by spurious factors, then the signal on line 685 will gradually assume the original value of 10 on line 670.

Block 684 thus acts as a filter because it prevents rapid (i.e., high frequency) jumps in stator error from propagating past multiplier 679. The loop indicated by arrow 695 will now be considered.

Max- and min-select blocks 712 and 713 each receive a margin signal on a respective line 651 and 650. Each margin signal represents the difference between the last demanded valve position, provided by a respective z-block 645 or 646, and limits, provided by blocks 642 and 643. One limit, in block 643, represents a maximum allowable valve position, while the other limit, in block 642, represents a minimum allowable valve position. The margins thus limit the signal on line 715 through max- and min-select blocks 712 and 713.

The margins limit the valve speed when the valve is approaching either the maximum or minimum positions. For example, if the demanded valve position were very close to the maximum position, the difference produced by summer 639A would be very small, and so the valve position allowed by min select block 712 would be the same small difference.

Similarly, max- and min- select blocks 653 and 656 limit the signal on line 715, but for a different reason. These latter blocks prevent the demanded valve rate, which is provided by the control system on line 715, from exceeding the fastest rate of motion attainable by the valve: the control is not allowed to demand a rate of valve movement which the valve cannot attain.

The output of maximum selector 656 is fed to z-block 717, and to summer 660. It should be recognized that this output, while previously described as a valve poppet position, actually represents a velocity of the poppet. That is, the signal is applied to a servomoter, known in the art, and, so long as the signal is applied, the servomotor moves the valve poppet. The velocity depends upon the signal magnitude. Consequently, z-block provides a time rate of change of velocity, which is an acceleration. Therefore, line carries a signal indicative of valve poppet, or valve gate, acceleration.

This acceleration signal modifies the signal provided by multiplier 679 as follows. A fractional value is carried by line 719, based on HPTCMOD, which is the signal produced by block 393 in FIG. 12. HPTCMOD is the signal which modifies the time constants of the casing, as discussed above in the section entitled "(D) HPT Casing Temperature (FIG. 10)." The fractional value, on line 719, applies part of the previous acceleration, provided by z-block 720, to summer 721, wherein the difference between the two accelerations is provided on line 722. The difference is added to the previous value in summer 723, and the result is subtracted in summer 724.

One way to view the modification just described is that the computation in dashed block 725 serves to match the demanded acceleration, produced by max select block 656, with the acceleration which the casing can undergo, based on its present time constants. If too much acceleration is demanded, the output of summer 723 serves to reduce the demanded acceleration, produced by max selector 656, because of the subtraction occurring in summer 724.

(I) LPT System Overview (FIG. 20)

This discussion will now consider a control system used to control the clearance 740 in FIG. 1A between the low pressure turbine 18 and the low pressure turbine casing 744. A fan bleed similar to that used for the high pressure turbine is employed, as indicated in FIG. 1A.

FIG. 20 is an overview of the system, similar in content to FIG. 4. Block 753 in FIG. 20 computes the desired size of the clearance 740 in FIG. 1A, based on fan speed. Fan speed is used in FIG. 20, as opposed to actual core speed used in FIG. 4, because the fan 21 in FIG. 1A is fastened to the same shaft as the low pressure turbine 18, and the term "fan speed" is an accepted term in the art for the speed of the low pressure spool, which includes the fan 21, the booster 6, and the low pressure turbine 18.

Block 756 computes rotor displacement based on four input parameters: fan speed; the temperature of the cavity 757 within which the rotor disk 758 in FIG. 1A is located; low pressure turbine inlet total temperature; and low pressure turbine inlet static pressure. These four parameters are analogous to the four parameters used by block 107 in FIG. 4, for the high pressure rotor displacement: fan speed is analogous to core speed; low pressure turbine inlet pressure is analogous to compressor discharge static pressure because each applies pressure to its respective turbine casing; low pressure turbine inlet temperature is analogous to high pressure turbine inlet temperature; and cavity temperature is analogous to compressor discharge temperature, because the latter is used to purge the high pressure turbine cavity, as discussed above.

The output of block 756 in FIG. 20 indicates rotor displacement, which is added in summer 764 to the desired clearance, from block 753, from which is subtracted the cold clearance in block 767. The output of summer 764 is the demanded casing position.

Deviation by the casing from this demanded position is ascertained in summer 770, which computes the casing error. The input, on line 772, to summer 770 is stator displacement, which is computed in block 774, based on the four indicated input parameters. The remainder of FIG. 20 is analogous to the remainder of FIG. 4, and the discussion above in the section entitled "(A) System Overview" is applicable.

Figure 21:
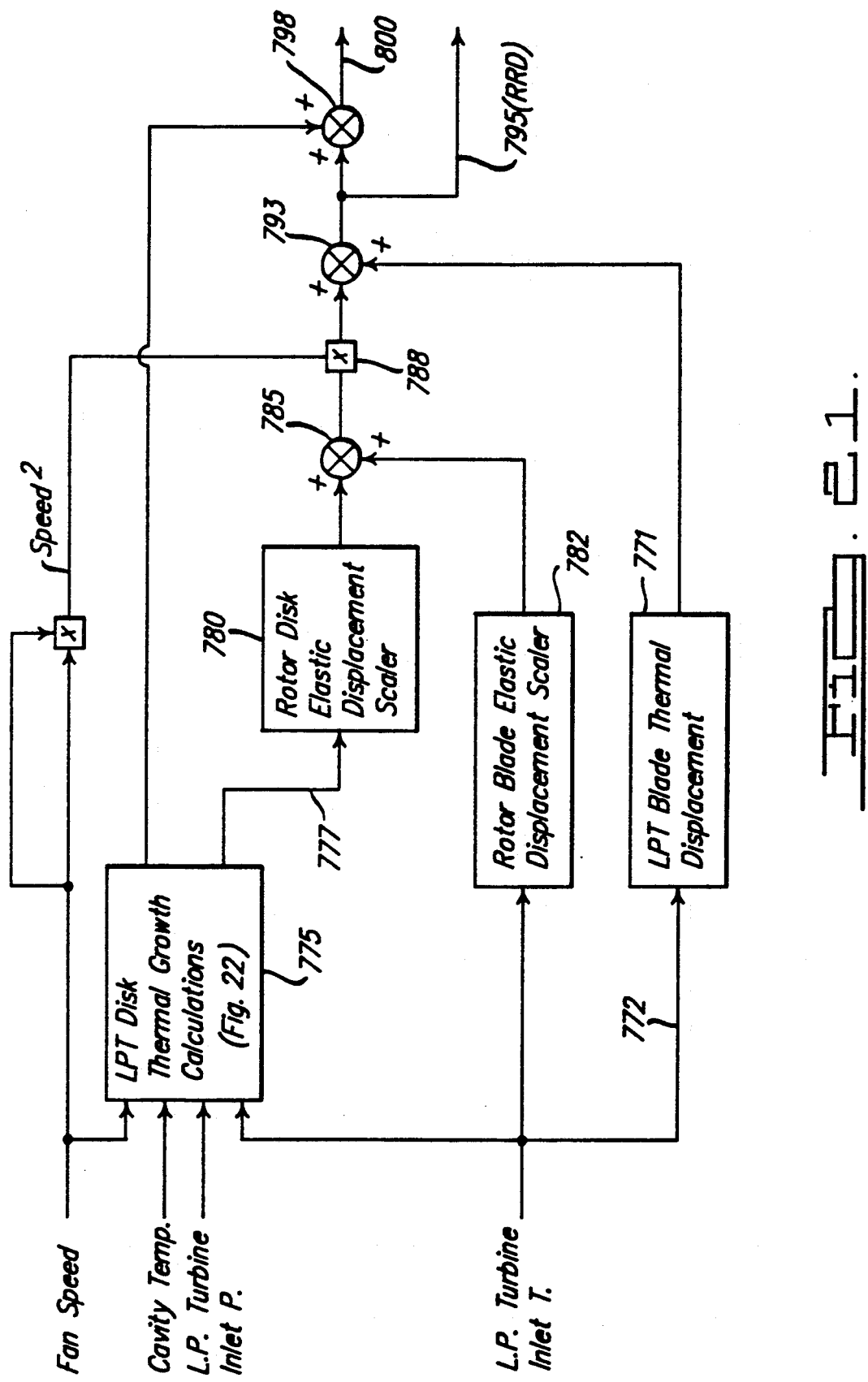

FIG. 21, which computes rotor displacement for the low pressure turbine, will be compared to FIG. 5, which computes rotor displacement for the high pressure turbine. Block 771 in FIG. 21 computes blade thermal displacement, which is the elongation of the turbine blades occurring as a result of temperature changes. The input, on line 772, is blade temperature, which will be at or near the low pressure turbine inlet temperature, which is the measured parameter on line 772. The calculation of blade temperature is more straightforward than the calculation done for block 192 in FIG. 5, because, in FIG. 5, blade temperature is a function both of cooling air as well as of the combustion gases which impinge upon the blades. No such cooling is done for the low pressure turbine blades in the preferred embodiment, and so the computation in FIG. 21 is simpler. However, if blade cooling were used, the computation of FIG. 5 can be used.

Block 775 in FIG. 21, based on four parameters, namely, fan speed, the temperature of the cavity 757 in FIG. 1A which contains the low pressure turbine, low pressure turbine inlet pressure, and low pressure turbine inlet temperature, computes the following: temperature of the hub and rim (which correspond in concept to the bore and web of FIG. 35), on line 777, and, based on the temperatures, the hub and rim displacement.

The temperature on line 777 is used by block 780 in order to compute the change of Young's modulus of the rotor material. Similarly, block 782 computes the change in Young's modulus of the turbine blades. These modulus changes are added in summer 785, which feeds multiplier 788, which multiplies the sum by core speed squared, carried on line 790. Multiplier 788 performs a function similar to that done by multiplier 173 in FIG. 5.

A computation of Young's modulus for the turbine blades is done in FIG. 21, but not done in FIG. 5 for the high pressure turbine. One reason is that the low pressure blades are much longer than the high pressure turbine blades, and so the displacement of the blades resulting from centrifugal force is a larger absolute distance than in the case of the high pressure turbine.

The centrifugal displacement, from multiplier 788, is added to the blade thermal displacement, from block 771, in summer 793, providing a signal on line 795, which is a rapid rotor displacement signal (RRD), as in FIG. 5. The signal is termed a rapid rotor displacement because the displacement occurs almost instantaneously as rotor speed increases: centrifugal displacement is instantaneous, and the turbine blades follow the temperature of the gases entering the turbine so rapidly that the blade thermal growth computed in block 770 can be viewed as almost instantaneous.

Rapid rotor displacement is added in summer 798 to disk thermal displacement, giving the actual displacement of the entire rotor on line 800, which line is also shown in FIG. 20. The computation of block 775 in FIG. 21 will now be considered.

Figure 23:
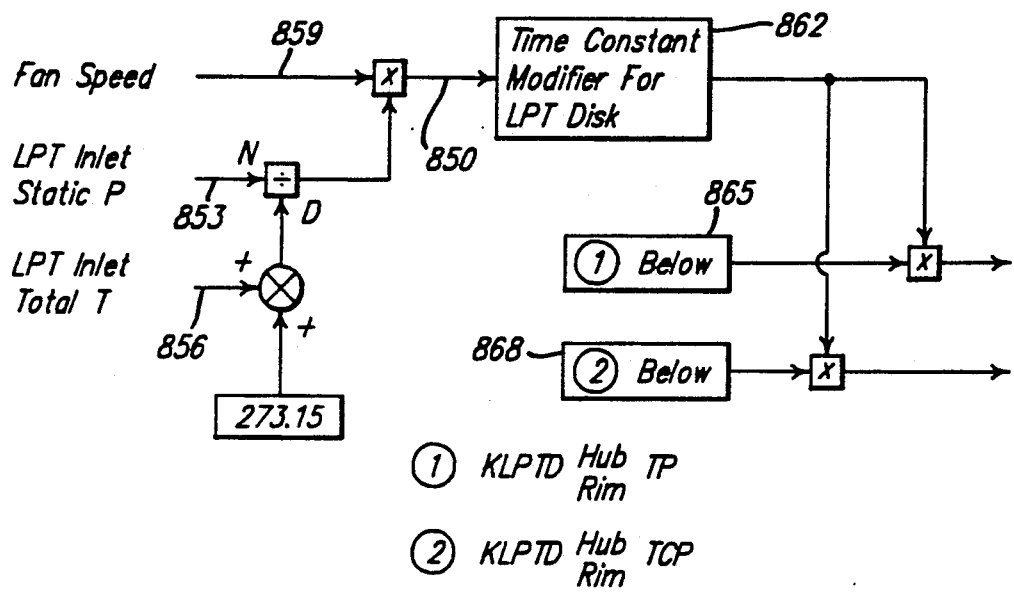

The operation of a similar block 209 in FIG. 6 is explained in the discussion above under the heading "(B) HPT Rotor Displacement, Overview (FIG. 6)." Similar to the high pressure turbine situation, shown in FIG. 7, two time constants (in blocks 865 and 868) in FIG. 23 are used for the low pressure disk, one for a rim region and one for a hub region. For the low pressure turbine, the hub region is considered to terminate at point 318D in FIG. 35, which is at a value of 40 on the scale of 0 to 100 in the Figure, as opposed to the termination point of the bore for the high pressure turbine, which is at a value of 40 units, as stated above.

As in FIG. 7, for the high pressure turbine, a power parameter in FIG. 23 is computed on line 850, similar to that on line 246 in FIG. 7, and the power parameter is an indicator of the insulating capacity (or, conversely, the heat conductivity) of the pressurized air surrounding the disk. For example, dense, high pressure air, at a high temperature as indicated by the parameters on lines 853 and 856, will tend to heat the disk faster when fan speed, on line 859, is high, because of the relative motion between the disk and the air provides a scrubbing action which promotes heat transfer.

The output of block 862 in FIG. 23 is a pair of modifiers, one for each time constant of the disk, which are contained in blocks 865 and 868. As discussed above in connection with the high pressure turbine, the heat transfer model used presumes a second order system having two time constants, namely, a rapid time constant and a slow time constant. The time constants in blocks 865 and 868 for the low pressure turbine are analogous to the time constants in blocks 250 and 252 in FIG. 7 for the high pressure turbine.

Figure 22:
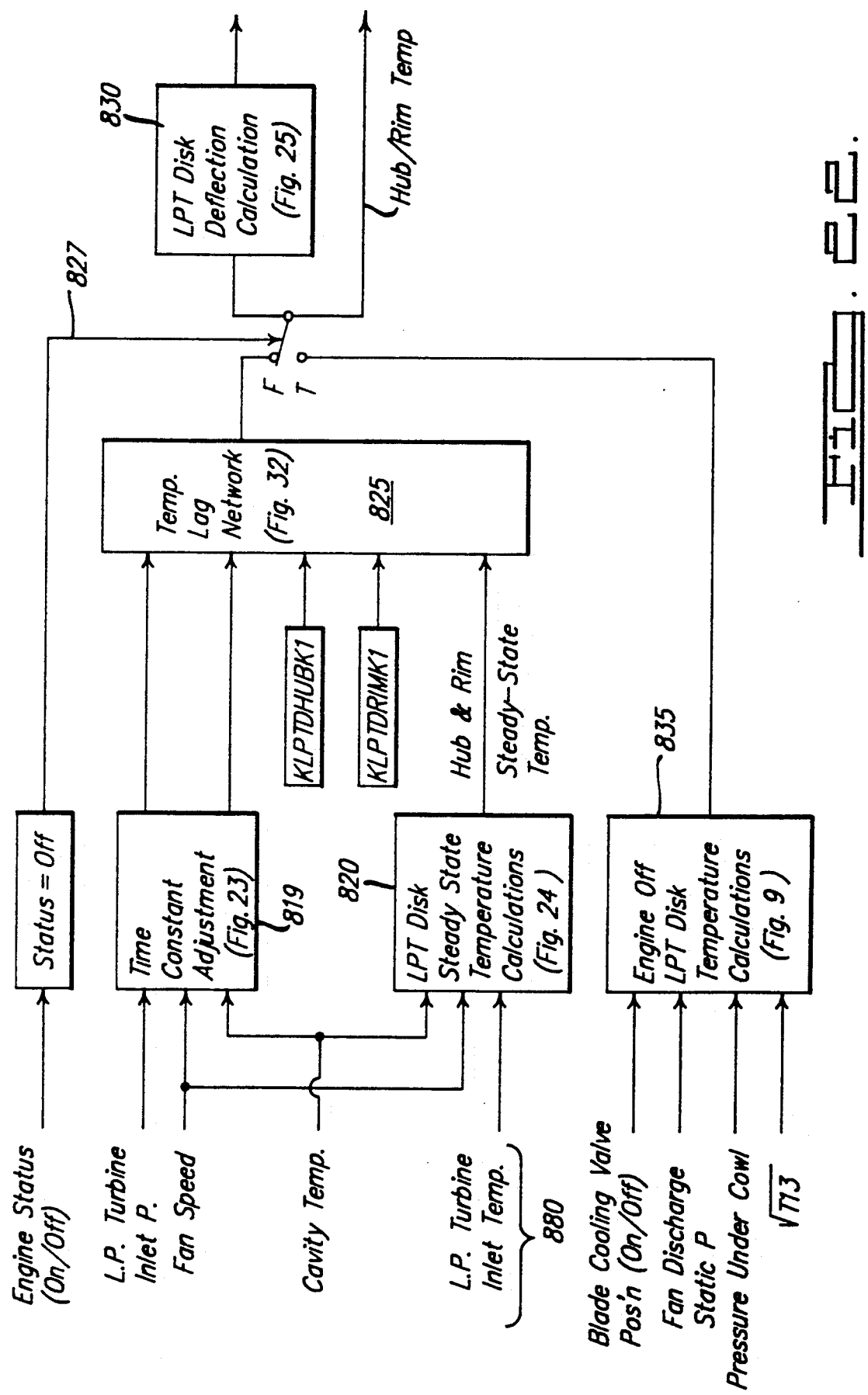
Figure 24:
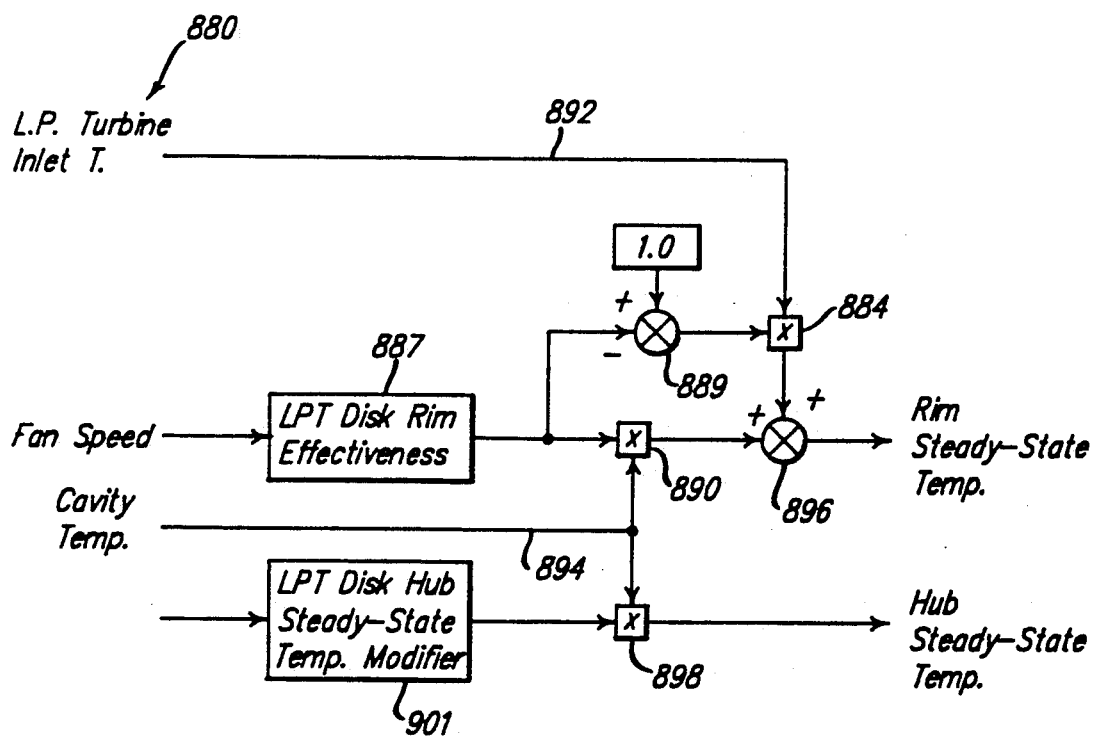

Block 820 in FIG. 22 computes the steady state temperature of the turbine disk 758 (ie, for both hub and rim) in FIG. 1A which will be attained if the operating conditions indicated by the parameters on input lines 880 remain in effect. FIG. 24 illustrates the computation of the steady state hub and rim temperatures in more detail.

Rim temperature is affected not only by the temperature of the air in the cavity 757 in FIG. 1A, but also by heat flow from the air impinging upon the turbine blades. Thus, rim steady state temperature is influenced by signals on both lines 892 and 894 in FIG. 24. Block 887 provides a factor to multiplier 890 which indicates the effectiveness of heat transfer based on scrubbing between the air in the cavity 757 and the disc 758, and the factor is a function of fan speed. Block 887 also provides a factor to multiplier 884 which indicates the rate of heat flow from the turbine gases to the rim.

On the other hand, hub temperature is influenced predominantly by cavity temperature, and so block 901 provides a signal to multiplier 898 indicative of the effectiveness of heat transfer between the cavity air and the hub.

The steady state temperature of both the hub and rim, computed in FIG. 24, together with two time constants for each, from blocks 865 and 868 in FIG. 23, are fed to the lag network 825 in FIG. 22, which is shown in FIG. 32 and which is identical to that shown in FIGS. 7 and 15 and which is explained under the heading "(G) Temperature Lag Network (FIG. 15)" above.

The output of the lag network 825 in FIG. 22 is fed to the disc displacement block 830 if the status indicator 827 indicates that the engine is running. If the status indicator indicates that the engine is not running, then block 830 computes the disc temperature in the same manner as described in connection with FIG. 9, in the section entitled "(B)(1)(ii) HPT Disc Running Temperature, Non-Running Case (FIGS. 6 and 9)."

Figure 25:
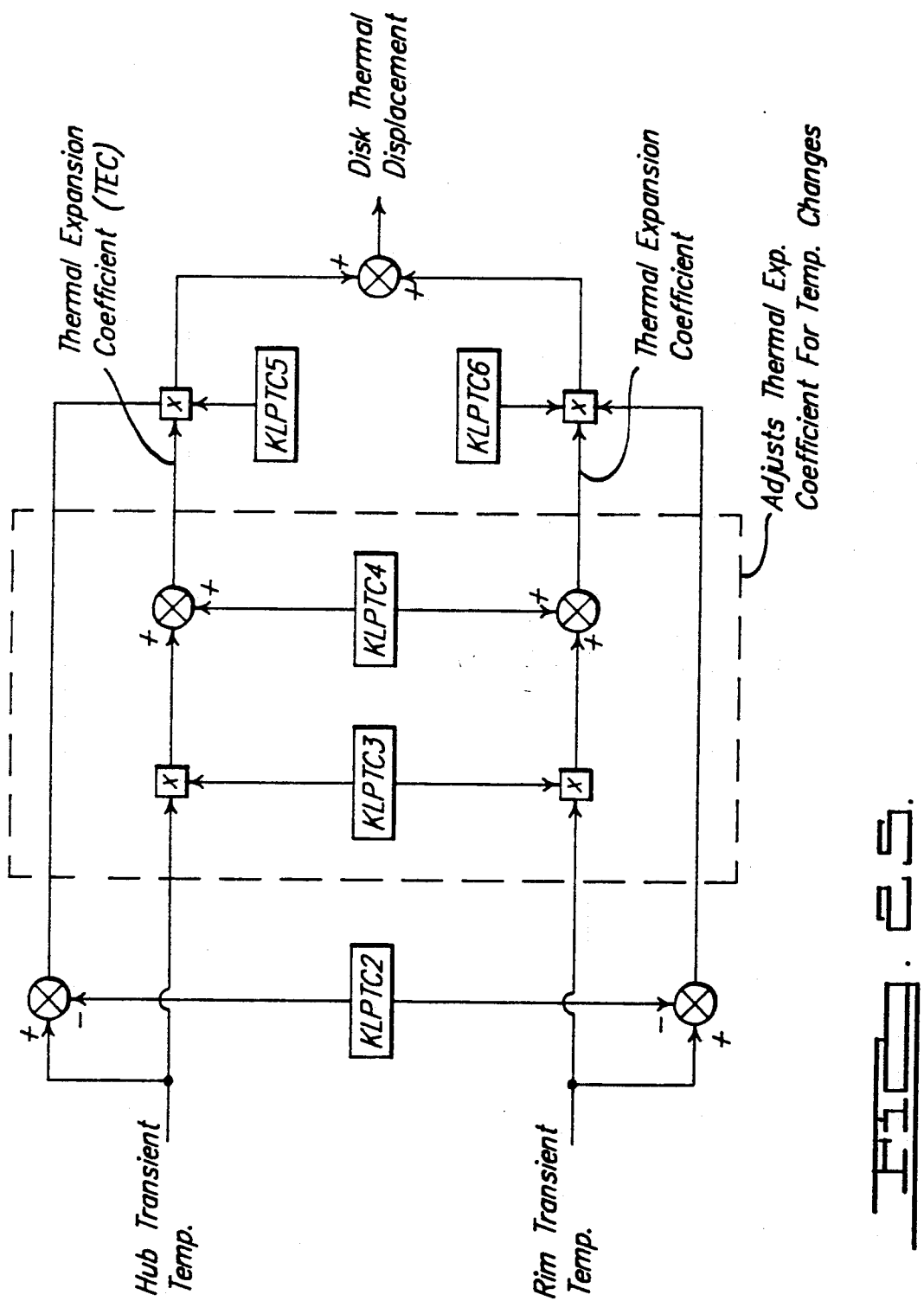

Whether the engine is running or not, block 830 computes disc displacement, and is shown in more detail in FIG. 25. The operation of FIG. 25 is similar to that of FIG. 8, with the exception of the use of different constants, such as KLPTC2. The operation of FIG. 8 is described in the section above entitled "(B)(1) HPT Disc Thermal Displacement FIG. 6)."

The preceding discussion has explained how low pressure rotor displacement, on line 800 in FIG. 21, is computed. This discussion will now consider the computation of low pressure casing displacement.

Figure 26:
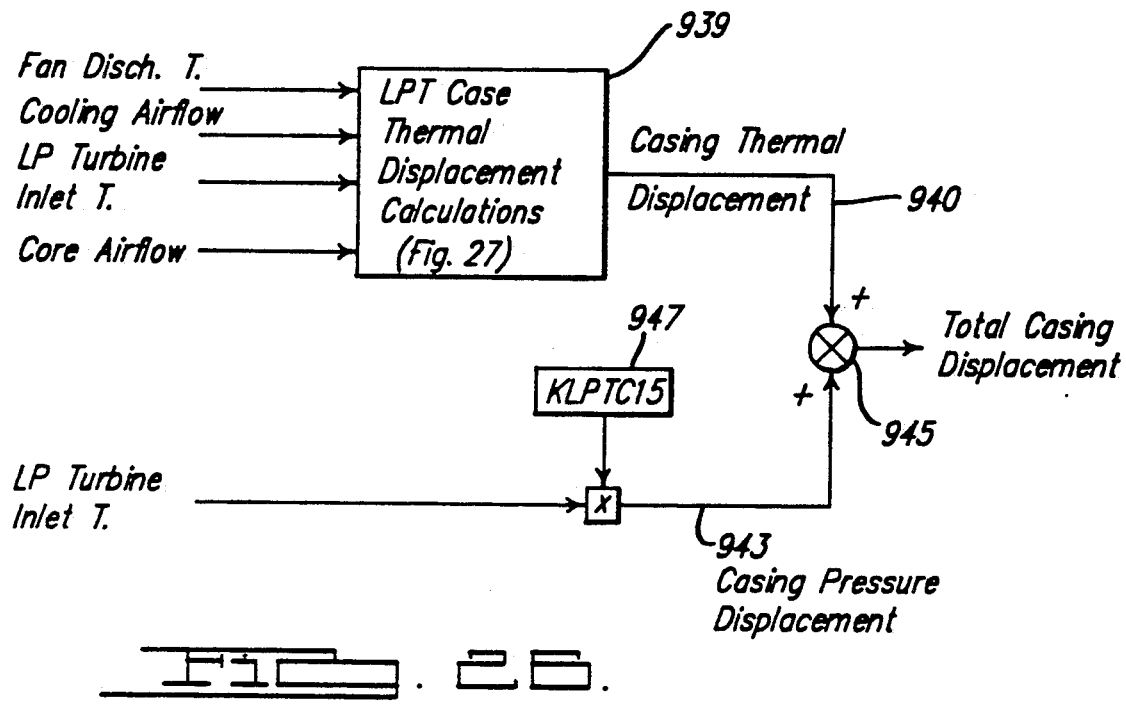

In FIG. 26, casing thermal displacement, on line 940, is added to the displacement, on line 943, caused by pressure within the casing. In general, the pressure displacement is a linear function of low pressure turbine inlet pressure, and so, multiplication of this pressure by the constant in block 947 allows one to compute the pressure displacement.

Figure 27:
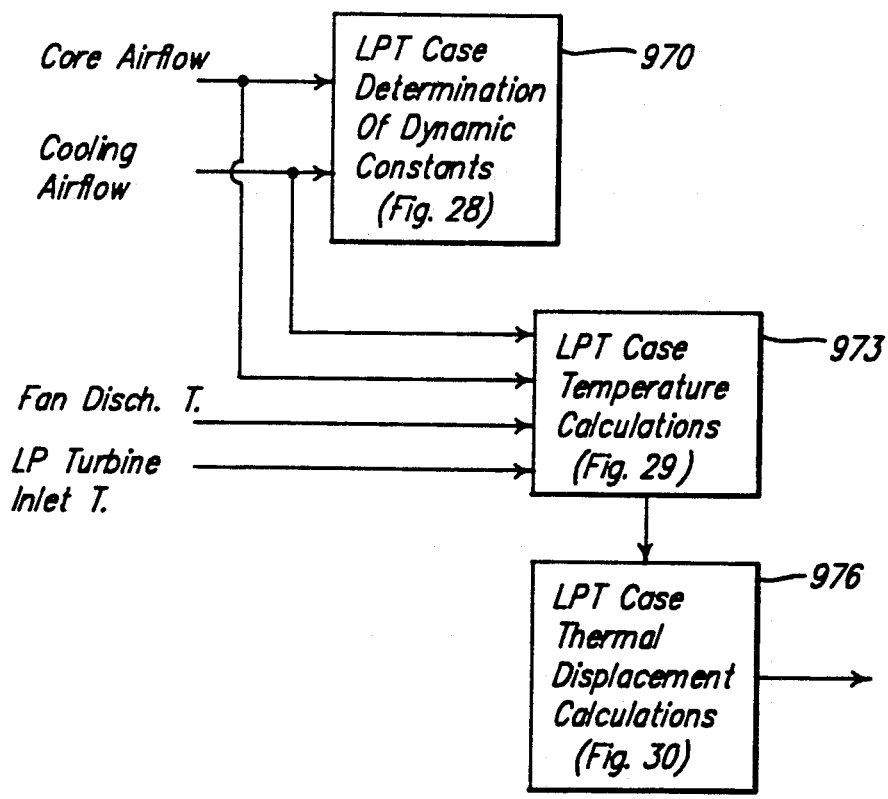
Figure 28:
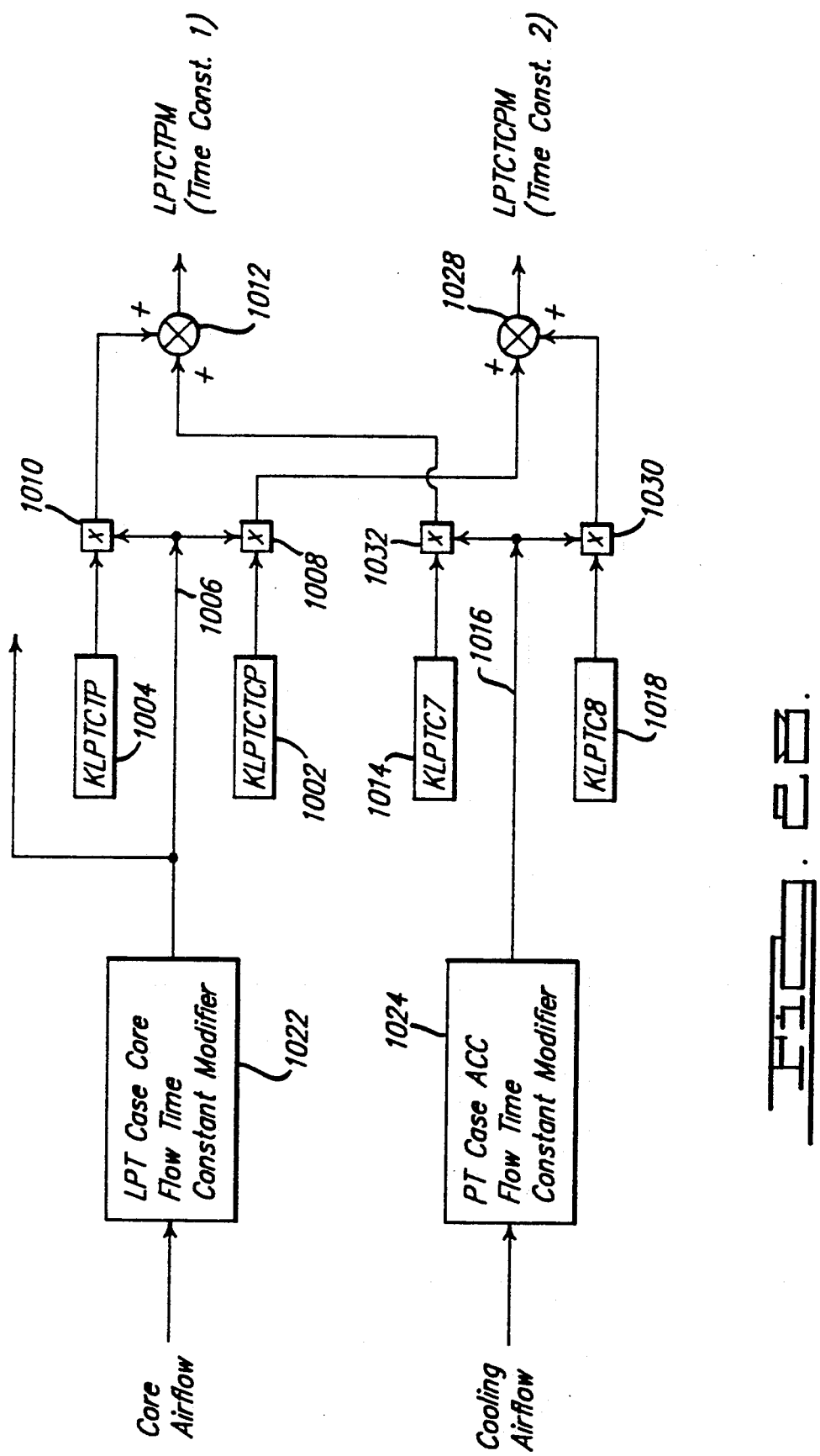

The thermal displacement is computed as shown in FIGS. 27-30. In FIG. 27, block 970 computes the two time constants of the casing based on core airflow and cooling airflow. The time constants are used by block 973 which computes actual, transient temperature, which is sent to block 976 which uses the computed temperature in order to compute actual casing displacement. Block 970 is shown in more detail in FIG. 28.

The time constants, in blocks 1002 and 1004, have the nominal values given in FIG. 34. Each time constant is modified in FIG. 28 by both core flow and cooling air flow, for similar reasons as the time constants in blocks 398 and 401 in FIG. 12 are modified by core flow.

Both time constants in blocks 1002 and 1004 are multiplied by the core flow modifier of block 1022, to produce a pair of first time constant (TC) products leading from multipliers 1008 and 1010.

Another pair of constants, in blocks 1014 and 1018, are each multiplied by a cooling flow modifier in block 1024, to produce a pair of second TC products, leading from multipliers 1030 and 1032. One of the second TC products, from multiplier 1032, is added, in summer 1012, to one of the first TC products, namely, that from multiplier 1010. The other second TC product is added to the other first TC product in summer 1028. In this manner, each time constant is influenced by both core airflow and cooling airflow, for reasons similar to those given above for the time constants in blocks 398 and 401 in FIG. 12.

Figure 29:
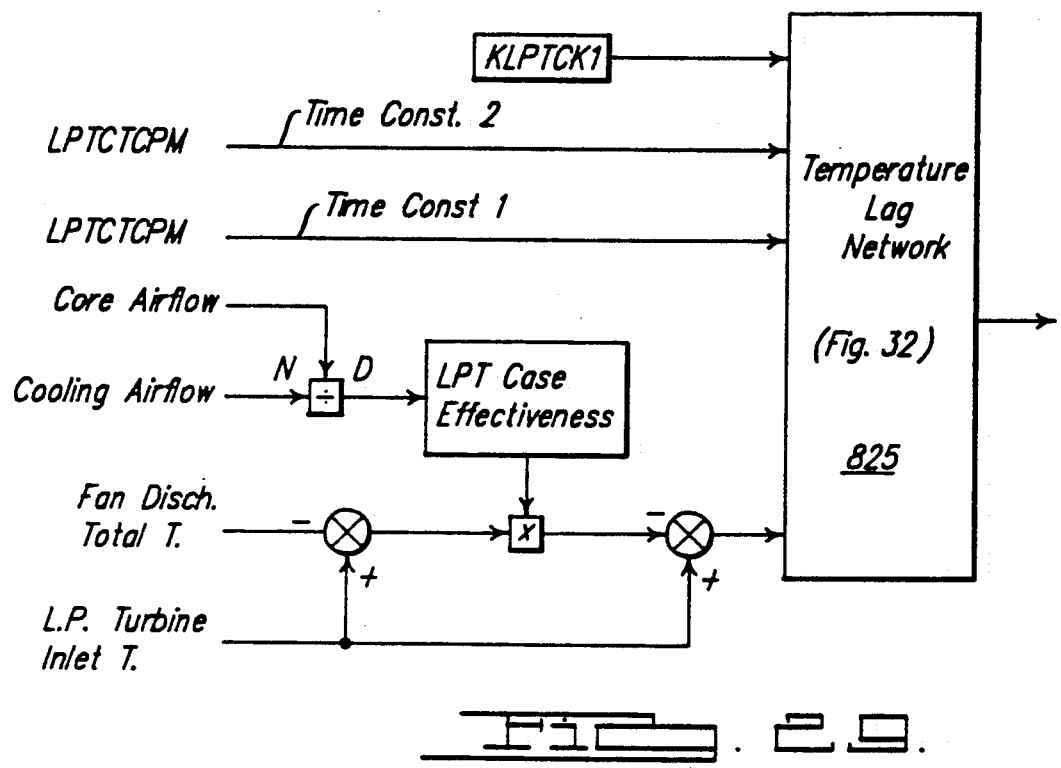
Figure 30:
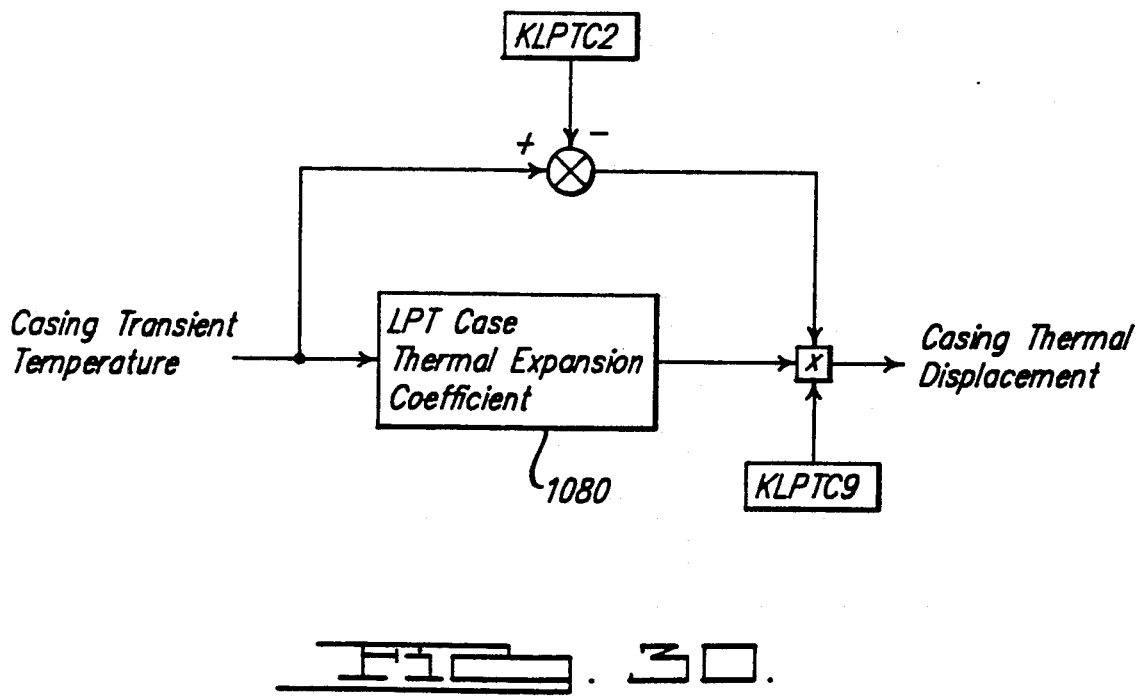

The functioning of the lag network 1050 in FIG. 29, which is shown in more detail in FIG. 32, is substantially identical to that of FIG. 15, for the high pressure turbine, and the discussion above under the section entitled "(G) Temperature Lag Network (FIG. 15)" explains the operation. The output of the lag network 1050 in FIG. 29 indicates the actual temperature of the casing 744 in FIG. 1A, and is fed to block 976 in FIG. 27, which is shown in more detail in FIG. 30. The operation in FIG. 30 is substantially identical to that of FIG. 13, when one understands that block 1080 in FIG. 30 is indicated by dashed block 507 in FIG. 13. The discussion above in the section entitled "(E) HPT Casing Displacement (FIG. 13)" will explain the computation of the casing thermal displacement in FIG. 30.

The preceding discussion has explained how casing displacement has been computed based on two components which comprise the displacement, namely, pressure displacement and thermal displacement.

Figure 31:
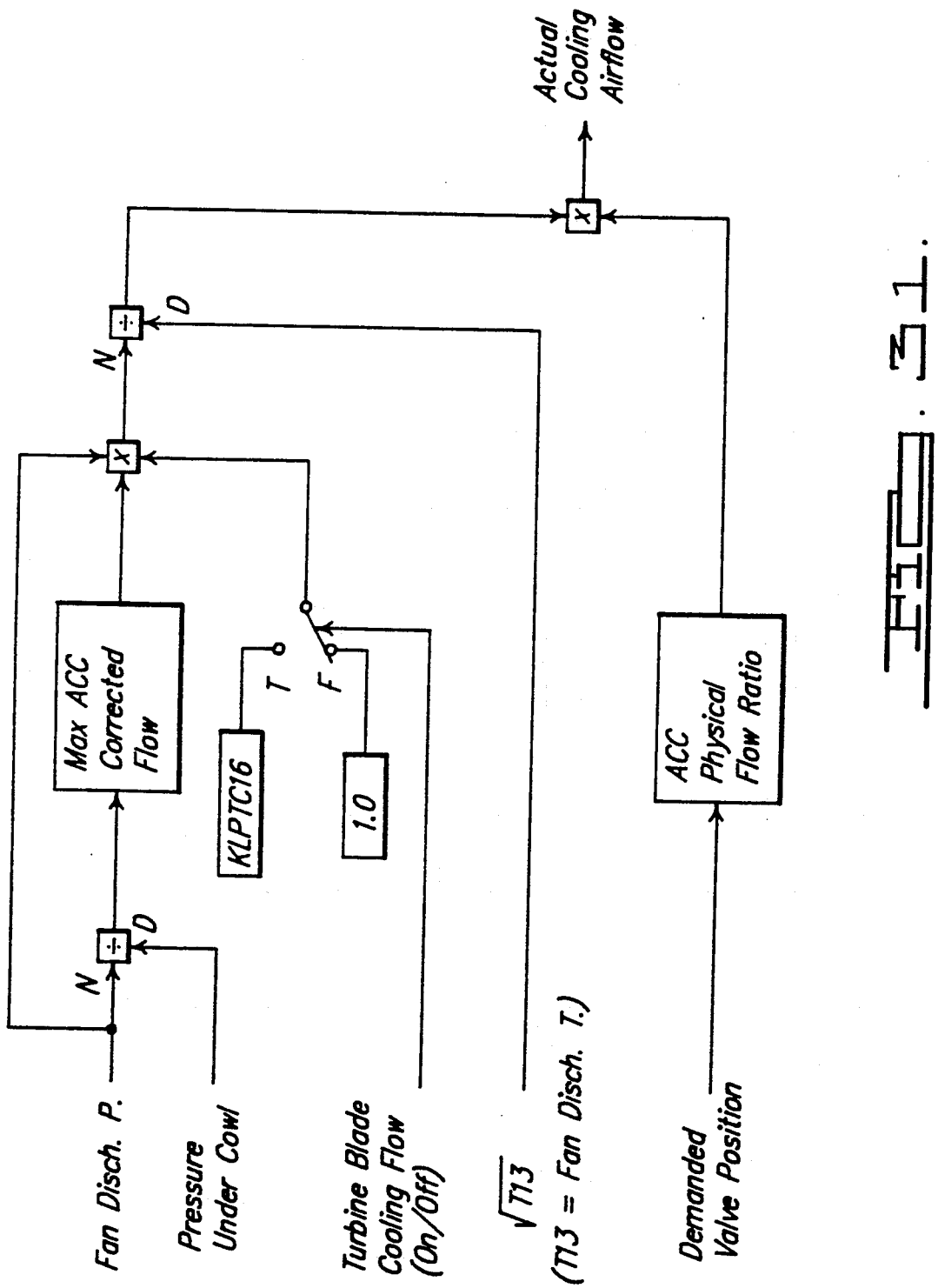
Figure 33:
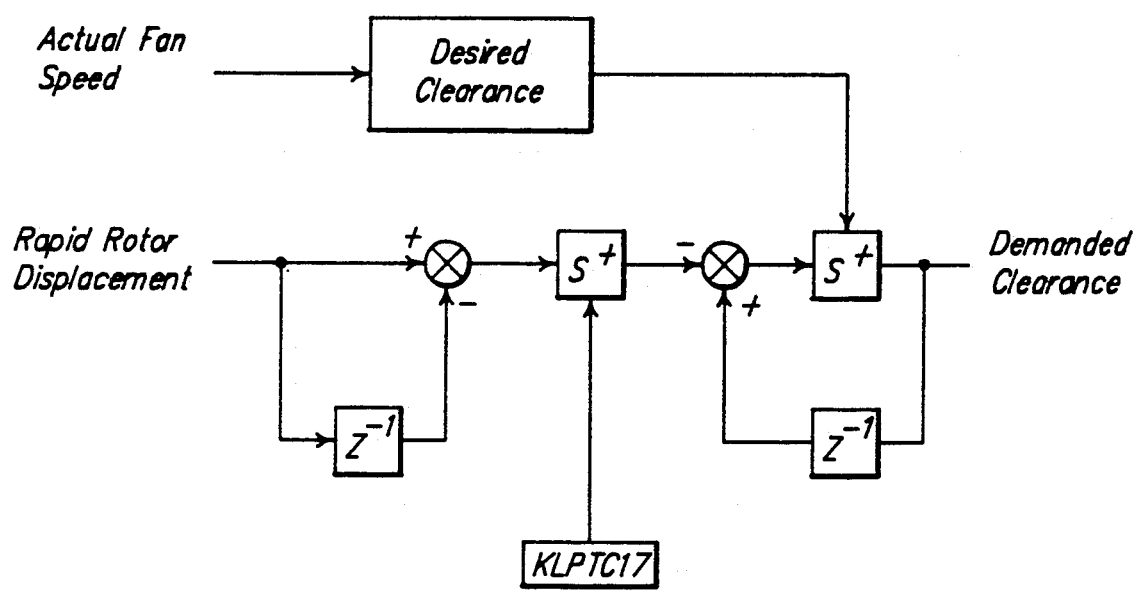

The computations of FIGS. 29, 31, and 33 are substantially identical to those for FIGS. 12, 14, and 18, respectively. Further, the valve regulator dynamics block 776 of FIG. 20 is substantially similar to that of FIG. 4, so that the former discussion applies to the latter.

Several important features of the invention are the following. One, FIGS. 19 and 34 list constants which are used by the computations outlined in the other figures.

Two, the use of a lag network such as 266 in FIG. 7 causes the computed temperature of a component, such as a casing or rotor, to mimic the actual component temperature during transients. Consequently, the pinch points which otherwise tend to occur, as described in the background of the invention, are substantially reduced or eliminated. One reason is that the mimicry gives accurate information as to component size, which allows the control system to know of the imminence of a pinch point, and to terminate or reduce shrinkage of the casing in response.

Three, it is to be emphasized that FIGS. 4-34 illustrate one form of the invention, and in flow chart style. The flow chart represents a computer program for use in a programmable digital computer. Of course, the program can be implemented in other ways, such as in an analog computer, or in a non-programmable digital computer.

Four, the invention estimates the present, instantaneous temperature of an engine component, such as a rotor or a casing, based on the changes occurring in the steady state temperature which is predicted to be attained by the component when the engine reaches steady state under the present operating conditions. That is, the time-behavior of the predicted, steady state temperature allows one to infer the present, instantaneous temperature of the component.

It is recognized that, since the steady state temperature is computed from selected engine operating conditions such as those feeding to blocks 107 and 126 in FIG. 4, one can compute the instantaneous temperature directly from changes in the operating conditions.

Five, the invention, in having the ability to compute steady-state and instantaneous temperatures of the rotors and casings, can be viewed as containing a mathematical model of the rotors and casings. The model gives the temperatures, and thus the dimensions, of these components at various engine operating conditions. Further, the model interpolates between dimensions, with a time lag added, when the operating conditions change.

Six, lag networks, such as network 266 in FIG. 7 have been discussed. The lag network causes an output variable, on line 268, to follow an input variable, on line 270. However, a lag is imposed upon the variable-following. For example, when the input variable jumps from one value to another, the output variable is constrained to approach, almost asymptotically, the output variable, with a speed determined by the relevant time constant.

Numerous substitutions and modifications can be undertaken without departing from the true spirit and scope of the invention as defined in the following claims.

What is claimed is:

1. A clearance control for a gas turbine engine, comprising:
   (a) means for calculating steady-state turbine rotor and casing diameters, based on measurements of selected engine operating characteristics;
   (b) means for computing a desired clearance between the rotor and casing based on engine speed; and
   (c) means for adjusting the temperature of the casing in order to drive the casing toward the desired clearance.

2. A clearance control for a gas turbine engine, comprising:
   (a) means for calculating steady-state turbine rotor and casing temperatures, based on measurements of selected engine operating characteristics;
   (b) means for calculating turbine rotor and casing diameters, based on the respective temperatures of (a);
   (c) means for computing a desired clearance between the rotor and casing based on engine speed; and
   (d) means for adjusting temperature of the casing in order to attain the desired clearance.

3. A clearance control for a gas turbine engine, comprising:
  (a) means for calculating steady-state turbine rotor and casing temperatures, based on measurements of selected engine operating characteristics;
  (b) means for inferring actual turbine rotor and casing temperatures, based on the behavior of the temperatures of (a);
  (c) means for calculating turbine rotor and casing diameters, based on the respective actual temperatures of (b);
  (d) means for computing a desired clearance between the rotor and casing based on engine speed; and
  (e) means for adjusting temperature of the shroud in order to attain the desired clearance.

4. A clearance control for a gas turbine engine, comprising:
  (a) means for calculating first, steady-state, turbine rotor and casing temperatures, based on measurements of selected engine operating characteristics;
  (b) means for modifying the first temperatures, based on the respective behaviors of the first temperatures;
  (c) means for calculating turbine rotor and casing diameters, based on the modified temperatures of (b);
  (d) means for computing a desired clearance between the rotor and casing based on engine speed; and
  (e) means for adjusting temperature of the casing in order to attain the desired clearance.

5. A clearance control for a gas turbine engine, comprising:
  (a) means for calculating a steady-state turbine rotor temperature and a steady-state casing temperature, based on measurements of selected engine operating characteristics;
  (b) means for estimating actual turbine rotor and casing temperatures, based on the behavior of the respective temperatures of; and
  (c) means for adjusting temperature of the casing based on the estimated rotor and casing temperatures.

6. A clearance control for a gas turbine engine, comprising:
  (a) means for calculating a desired clearance value between turbine rotor and turbine casing;
  (b) means for calculating the temperature of the turbine rotor web and the temperature of the turbine rotor bore (designated SSTW and SSTB, respectively) which would eventually exist at steady-state operation, based on
    (i) core speed,
    (ii) compressor discharge temperature, and
    (iii) compressor discharge pressure;
  (c) means for inferring the present temperatures of the web and bore, based on the time-behavior of SSTW and SSTB;
  (d) means for inferring displacement of the turbine rotor from its cold position, based on
    (i) the present temperatures of the web and the bore,
    (ii) the present temperature of turbine blades, and
    (iii) centrifugal growth of the web and bore;
  (e) means for calculating the temperature (SSTC), which would exist at steady-state operation, of the turbine casing;
  (f) means for inferring the present temperature of the turbine casing, based on the time-behavior of SSTC;
  (g) means for calculating displacement of the casing from its cold position, based on the present temperature of (f) and pressure within the casing;
  (h) means for calculating a demanded casing displacement, based on
    (i) the desired clearance,
    (ii) the displacement of the turbine rotor, and
    (iii) a correction factor for cold clearance;
  (i) means for ascertaining deviations of the actual displacement of the casing from the demanded displacement of the casing; and
  (j) means for reducing the deviation of the actual casing displacement from the demanded displacement by adjusting casing temperature.

7. In a clearance control, for controlling clearance between a casing and turbine blades in a gas turbine engine, which controls a valve which applies air to a turbine casing in order to shrink the casing, the improvement comprising:
  (a) means for detecting a throttle burst and producing a signal in response; and
  (b) means for reducing air flow through the valve in response to the signal.

8. In a clearance control in a gas turbine engine, in which air is ducted to a turbine casing in order to control the size of the casing by changing temperature of the casing, the improvement comprising
  (a) prediction means for predicting steady-state displacements of turbine rotor and turbine casing from their respective cold positions, based on airflow conditions and speed of the engine;
  (b) estimation means for estimating actual, transient, displacements of the rotor and casing based on the behavior of the predicted steady-state displacements; and
  (c) means for adjusting temperature of the casing based on the predicted transients of the rotor and casing displacements.

9. A control according to claim 8 in which the estimation means comprises first means for incrementally adjusting the estimated displacements in response to changes in the predicted steady-state displacements.

10. In a digital active clearance control for a gas turbine engine, in which a digital computer controls airflow to a turbine casing, in order to control the size of the casing by adjusting the temperature of the casing, the improvement comprising the steps of:
  (a) calculating diameter changes in the rotor based on rotor centrifugal growth and rotor thermal growth; and
  (b) adjusting temperature of a casing which surrounds the rotor, based on the calculated diameter changes, in order to maintain a predetermined clearance between the rotor and the casing.

11. In a digital active clearance control for a gas turbine engine, in which a digital computer controls airflow to a turbine casing, in order to control the size of the casing by adjusting the temperature of the casing, the improvement comprising the steps of:
  (a) estimating temperature of a turbine rotor based on length of time the engine has been shut down; and
  (b) adjusting temperature of a casing which surrounds the rotor, based on the estimated temperature.

12. In a digital active clearance control for a gas turbine engine, in which a digital computer controls airflow to a turbine casing, in order to control the size of the casing by adjusting the temperature of the casing, the improvement comprising the steps of:
   (a) estimating present temperature of a first engine component based on the behavior of a temperature which would exist in the component at steady state under present operating conditions; and
   (b) adjusting temperature of a second component, based on the estimated temperature, in order to control distance between the first and second components.

13. In a digital active clearance control for a gas turbine engine, in which a digital computer controls airflow to a turbine casing, in order to control the size of the casing by adjusting the temperature of the casing, the improvement comprising the steps of:
   (a) computing changes in diameter of a turbine rotor based on temperature change in two rotor regions; and
   (b) adjusting temperature of a casing surrounding the rotor in order to control clearance between the casing and rotor.

14. In a digital active clearance control for a gas turbine engine, in which a digital computer controls airflow to a turbine casing, in order to control the size of the casing by adjusting the temperature of the casing, the improvement comprising the steps of:
   (a) calculating changes in size of a turbine casing, based on pressure and temperature of air within the casing; and
   (b) adjusting temperature of the casing in order to control size of the casing.

15. In a digital active clearance control for a gas turbine engine, in which a digital computer controls airflow to a turbine casing, in order to control the size of the casing by adjusting the temperature of the casing, the improvement comprising the steps of:
   (a) computing size changes of supports for a turbine casing based on temperature;
   (b) deriving a diameter of the casing, based on the size changes and other inputs; and
   (c) adjusting temperature of the casing in order to control the size of the casing.

16. In a digital active clearance control for a gas turbine engine, which includes a cooling airflow which cools a turbine casing, the improvement comprising the steps of:
   (a) computing size changes of the casing based on
      (i) amount of cooling airflow,
      (ii) amount of core flow,
      (iii) temperature of the cooling airflow, and
      (iv) temperature of the core flow; and
   (b) adjusting temperature of the casing in order to attain a predetermined casing size.

17. In a digital active clearance control for a gas turbine engine, which includes an airflow which cools a turbine casing, the improvement comprising the step of:
   (a) computing size changes of the casing based on
      (i) flow rates of one or more airflows near the casing, and
      (ii) temperatures of the airflows; and
   (b) adjusting temperature of the casing in order to attain a predetermined casing size.

18. In a digital active clearance control for a gas turbine engine, in which a digital computer controls airflow to a turbine casing, in order to control the size of the casing by adjusting the temperature of the casing, the improvement comprising the steps of:
   (a) calculating dimensional changes of a first component based on temperature and a thermal expansion coefficient of the component;
   (b) modifying the coefficient based on temperature; and
   (c) adjusting temperature of a second component, based on the dimensional changes, in order to attain a desired clearance between the first and second components.

19. In a digital active clearance control for a gas turbine engine, in which a digital computer controls airflow to a turbine casing, in order to control the size of the casing by adjusting the temperature of the casing, and in which an airflow is ducted to a turbine casing in a duct having a valve, the improvement comprising the steps of:
   (a) calculating maximum flow expected in the duct when the valve is fully open, based on a pressure drop along the duct and the speed of sound of air in the duct;
   (b) calculating actual flow in the duct based on the maximum flow of (a) and valve position; and
   (c) adjusting valve position in order to attain a predetermined flow rate.

20. In a digital active clearance control for a gas turbofan engine, in which a digital computer controls airflow to a turbine casing, in order to control the size of the casing by adjusting the temperature of the casing, the improvement comprising the steps of:
   (a) cooling a turbine casing using a fan bleed; and
   (b) terminating cooling if a predetermined type of malfunction occurs to thereby cause the casing to expand.

21. In a digital active clearance control for a turbine rotor and casing in a gas turbine engine, in which a digital computer controls airflow to a turbine casing, in order to control the size of the casing by adjusting the temperature of the casing, the improvement comprising the steps of:
   (a) providing a signal indicative of dimensional changes of a turbine rotor which occur almost simultaneously with rotor acceleration; and
   (b) when the signal indicates that the dimensional changes exceed a limit, allowing the turbine casing to expand.

22. In a digital active clearance control for a gas turbine engine, in which a digital computer controls airflow to a turbine casing, in order to control the size of the casing by adjusting the temperature of the casing, the improvement comprising the steps of:
   (a) calculating a first, estimated steady-state temperature of a component of the engine based on engine operating conditions;
   (b) when changes in the estimated steady-state temperature occur, causing a variable to incrementally approach the first temperature; and
   (c) modulating the airflow which is used to adjust temperature of the component, based on said variable.

23. In a digital active clearance control for a gas turbine engine which contains a turbine rotor which includes a disc and blades, in which a digital computer controls airflow to a turbine casing, in order to control the size of the casing by adjusting the temperature of the casing, the improvement comprising the steps of:

(a) computing displacement of the rotor from its cold size, based on
   (i) thermal displacement of the disc;
   (ii) centrifugal displacement of the disc; and
   (iii) thermal displacement of the blades; and
(b) adjusting temperature of a casing which surrounds the rotor, based on the computed displacement.

24. The improvement according to claim 23 in which the thermal displacement of the blades is computed based on the temperatures of cooling air flowing through the blades and gases flowing between the blades.

25. In a digital active clearance control for a gas turbine engine, in which a digital computer controls airflow to a turbine casing, in order to control the size of the casing by adjusting the temperature of the casing, the improvement comprising:
  (a) means for providing a first signal indicative of temperature of a turbine rotor based on selected engine operating parameters;
  (b) means for providing a second signal indicative of the temperature of the rotor when the engine is not running;
  (c) means for selecting the first signal for computation of rotor size when the engine is running and for selecting the second signal for computation of rotor size when the engine is not running; and
  (d) adjusting temperature of a casing which surrounds the rotor, based on the computed rotor size.

26. The improvement according to claim 25 and further comprising means for computing rotor size based on the temperature signal selected.

27. In a digital active clearance control for a gas turbine engine, in which a digital computer controls airflow to a turbine casing, in order to control the size of the casing by adjusting the temperature of the casing, the improvement comprising:
  (a) means for predicting the steady state temperature which a turbine disc will attain at steady state, based on selected present operating conditions;
  (b) means for estimating the actual temperature of the disc based on the time-behavior of the steady state temperature, and including
     (i) lag means which causes the estimated actual temperature to lag the steady state temperature; and
  (c) means for adjusting the temperature of a casing which surrounds the disc, based on the estimated actual temperature of the disc.

28. In a digital active clearance control for a gas turbine engine, in which a digital computer controls airflow to a turbine casing, in order to control the size of the casing by adjusting the temperature of the casing, the improvement comprising:
  (a) means for providing at least one time constant from which temperature behavior of an engine component can be inferred;
  (b) means for modifying the time constant in response to changes in engine operating parameters, which parameters include engine speed, and the pressure and temperature of air which is in contact with the component; and
  (c) adjusting airflow which affects clearance between the component and a second component, based on the inferred temperature behavior.

29. In a digital active clearance control for a gas turbine engine, in which a digital computer controls airflow to a turbine casing, in order to control the size of the casing by adjusting the temperature of the casing, the improvement comprising:
  (a) a heat transfer model from which temperature of an engine component can be estimated based on
     (i) one or more time constants and
     (ii) changes in a first group of engine operating parameters which include engine speed and compressor discharge temperature;
  (b) means for adjusting the time constants based on changes in a second group of engine operating parameters which include engine speed and the temperature and pressure of air in contact with the component; and
  (c) adjusting airflow which affects clearance between the component and a second component, based on said estimated temperature.

30. In a digital active clearance control for a gas turbine engine, in which a digital computer controls airflow to a turbine casing, in order to control the size of the casing by adjusting the temperature of the casing, the improvement comprising:
  (a) means for computing the steady state temperature which will be eventually attained by an engine component, based on selected engine operating parameters which are presently occurring;
  (b) means for estimating present temperature of the component, which includes a lag system for causing a variable to pursue and lag the steady state temperature; and
  (c) means for adjusting airflow which affects the clearance between the component and a second component, based on the estimated present temperature.

31. In a digital active clearance control for a gas turbine engine, in which a digital computer controls airflow to a turbine casing, in order to control the size of the casing by adjusting the temperature of the casing, the improvement comprising:
  (a) a heat transfer model which computes temperature and size which will be attained at steady state for each of two parts of a turbine disc;
  (b) means for estimating present temperature of the two parts, based on changes in the temperatures of; and
  (c) means for adjusting size of a casing which surrounds the disc, based on one or more of the estimated present temperatures.

32. In a digital active clearance control for a gas turbine engine, in which a digital computer controls airflow to a turbine casing, in order to control the size of the casing by adjusting the temperature of the casing, the improvement comprising:
  (a) means for estimating present temperature of a turbine casing;
  (b) means for computing size of the casing based on the present temperature, thermal expansion coefficient of the casing, and a pressure within the casing;
  (c) means for comparing the computed size with a desired size; and
  (d) if the computed size differs from the desired size, adjusting the size of the casing by altering the casing temperature.

33. Apparatus according to claim 32 and further comprising means for modifying the thermal expansion coefficient based on the temperature of the casing.

34. In a digital active clearance control for a gas turbine engine, in which a digital computer controls airflow to a turbine casing, in order to control the size of the casing by adjusting the temperature of the casing, the improvement comprising:
  (a) means for estimating temperature of a turbine casing based on temperatures of airflows located near the casing;
  (b) means for computing casing size based on casing temperature; and
  (c) means for adjusting the size of the casing by altering the temperature of the casing.

35. In a digital active clearance control for a gas turbine engine, in which a digital computer controls airflow to a turbine casing, in order to control the size of the casing by adjusting the temperature of the casing, the improvement comprising:
  (a) a heat transfer model from which temperature of a turbine casing can be estimated based on
    (i) one or more time constants and
    (ii) changes in a first group of engine operating parameters which include engine speed and compressor discharge temperature;
  (b) means for adjusting the time constants based on changes in airflow through the engine; and
  (c) means for adjusting temperature of the casing, in order to attain a desired temperature, which is computed based on engine operating parameters.

36. In a digital active clearance control for a gas turbine engine, in which a digital computer controls airflow to a turbine casing, in order to control the size of the casing by adjusting the temperature of the casing, the improvement comprising:
  (a) means for providing data regarding temperature of a turbine casing;
  (b) means for computing casing displacement from a cold position of the casing, based on the temperature and a thermal expansion coefficient of the casing; and
  (c) means for adjusting temperature of the casing in order to attain a predetermined casing size.

37. In a digital active clearance control for a gas turbine engine, in which a digital computer controls airflow to a turbine casing, in order to control the size of the casing by adjusting the temperature of the casing, the improvement comprising:
  (a) means for computing a steady state temperature (SSTemp) for an engine component;
  (b) means for estimating the present temperature of the component based on changes occurring in the SSTemp; and
  (c) means for adjusting airflow which affects the clearance between the component and a second component, based on the estimated present temperature.

38. In a digital active clearance control for a gas turbine engine, in which a digital computer controls airflow to a turbine casing, in order to control the size of the casing by adjusting the temperature of the casing, the improvement comprising:
  (a) means for computing, based on selected engine operating conditions, a steady state temperature (SSTemp) which will be attained by an engine component;
  (b) means for estimating the present temperature of the component based on changes occurring in the operating conditions; and
  (c) means for adjusting airflow which affects the clearance between the component and a second component, based on the estimated present temperature.

* * * * *